United States Patent
Hase

(10) Patent No.: US 9,211,885 B2
(45) Date of Patent: Dec. 15, 2015

(54) VEHICLE CONTROL APPARATUS

(71) Applicant: DENSO CORPORATION, Kariya, Aichi-pref. (JP)

(72) Inventor: Tomomi Hase, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/331,901

(22) Filed: Jul. 15, 2014

(65) Prior Publication Data

US 2015/0025728 A1    Jan. 22, 2015

(30) Foreign Application Priority Data

Jul. 22, 2013 (JP) ................................. 2013-151753

(51) Int. Cl.
- *B60W 20/00* (2006.01)
- *B60K 6/445* (2007.10)
- *B60W 50/02* (2012.01)

(52) U.S. Cl.
CPC ................ *B60W 20/00* (2013.01); *B60K 6/445* (2013.01); *B60W 20/10* (2013.01); *B60W 20/50* (2013.01); *B60W 2050/021* (2013.01); *B60W 2050/022* (2013.01); *B60W 2510/0657* (2013.01); *B60W 2510/083* (2013.01); *B60W 2520/10* (2013.01); *B60W 2540/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,271,474 A | * | 12/1993 | Nishimoto et al. | 180/446 |
| 5,481,460 A | * | 1/1996 | Masaki et al. | 701/50 |
| 5,909,720 A | * | 6/1999 | Yamaoka et al. | 123/179.3 |
| 6,278,195 B1 | * | 8/2001 | Yamaguchi et al. | 290/40 A |
| 2009/0133947 A1 | | 5/2009 | Yoshihara et al. | |
| 2013/0179014 A1 | * | 7/2013 | Yamazaki et al. | 701/22 |

FOREIGN PATENT DOCUMENTS

JP    2002-147277    5/2002

* cited by examiner

*Primary Examiner* — Thomas Tarcza
*Assistant Examiner* — Edward Pipala
(74) *Attorney, Agent, or Firm* — Nixon & Vanderhye P.C.

(57) ABSTRACT

In an apparatus for controlling a vehicle having driving sources, a driver request torque command is calculated based on driver operation information, driving-source commands used to control the sources are calculated by dividing the request torque command among the sources, a driver request torque monitor value used to monitor an abnormality in the request torque command is calculated, driving-source monitor values used to monitor an abnormality in the driving-source commands are calculated, a driver request torque monitor margin used to determine the abnormality in the request torque command based a difference between the request torque command and monitor value is calculated, driving-source monitor margins used to determine the abnormality in the driving-source commands based on differences between the driving-source commands and monitor values are calculated based on the request torque monitor margin, and the abnormality in the driving-source commands is determined based on the driving-source monitor margins.

17 Claims, 30 Drawing Sheets

VEHICLE CONTROL APPARATUS

CROSS REFERENCE TO RELATED APPLICATION

This application is based on Japanese Patent Application No. 2013-151753 filed on Jul. 22, 2013, the contents of which are incorporated herein by reference.

FIELD

The present disclosure relates to a vehicle control apparatus.

BACKGROUND

In a conventional control technique to run a hybrid vehicle, it is detected whether an output torque is normal. For example, in JP-B-4085570, a difference between a target output and an actual output is calculated, and an abnormality is determined by monitoring the difference.

In JP-B-4085570 where the abnormality is determined based on a comparison between the target output and the actual output, the abnormality cannot be determined until the target output is produced based on a command value. Therefore, if the command value is abnormal, a vehicle driver may feel uncomfortable until the abnormality is determined.

In particular, in a hybrid vehicle with both an engine and a motor as driving sources, a request torque is divided between the engine and the motor. Therefore, there is a need to determine an abnormality in a command value for each driving source.

SUMMARY

It is an object of the present disclosure to provide a vehicle control apparatus capable of determining an abnormality in a driving-source command value used for control of a driving source of a vehicle.

According to an aspect of the present disclosure, a vehicle control apparatus is used for controlling a vehicle equipped with driving sources including an engine and a rotating electrical machine. The vehicle control apparatus includes a driver request torque command value calculating device, a driving-source command value calculating device, a monitor value calculating device, a driver request torque monitor margin setting device, a driving-source monitor margin calculating device, and an abnormality determining device.

The driver request torque command value calculating device calculates a driver request torque command value based on driver operation information. The driving-source command value calculating device calculates driving-source command values, which are used to separately control the driving sources, by dividing the driver request torque command value among the driving sources.

The monitor value calculating device calculates a driver request torque monitor value and driving-source monitor values. The driver request torque monitor value is used to monitor an abnormality in the driver request torque command value. The driving-source monitor values are used to monitor an abnormality in the driving-source command values.

The driver request torque monitor margin setting device sets a driver request torque monitor margin. The driver request torque monitor margin is used to determine the abnormality in the driver request torque command value based a driver request torque excess amount which is a difference between the driver request torque command value and the driver request torque monitor value.

The driving-source monitor margin calculating device calculates driving-source monitor margins based on the driver request torque monitor margin. The driving-source monitor margins are used to determine the abnormality in the driving-source command values based on driving-source excess amounts which are differences between the driving-source command values and the driving-source monitor values.

The abnormality determining device determines the abnormality in the driving-source command values based on the driving-source monitor margins.

According to the aspect of the present disclosure, the driver request torque monitor margin is set, the driving-source monitor margins are calculated based on the driver request torque monitor margin, and the abnormality in the driving-source command values is determined based the driving-source monitor margins. In such an approach, the abnormality in the driving-source command values can be determined before the driving-source command values are outputted to the driving sources without using control results (e.g., actual torque) obtained by actually controlling the driving sources with the driving-source command values.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure are described below with reference to the drawings, in which the same characters refer to the same or corresponding parts.

First Embodiment

A vehicle control system 1 including a vehicle control apparatus according to a first embodiment of the present disclosure is described below with reference to FIGS. 1-7B.

Figure 1:
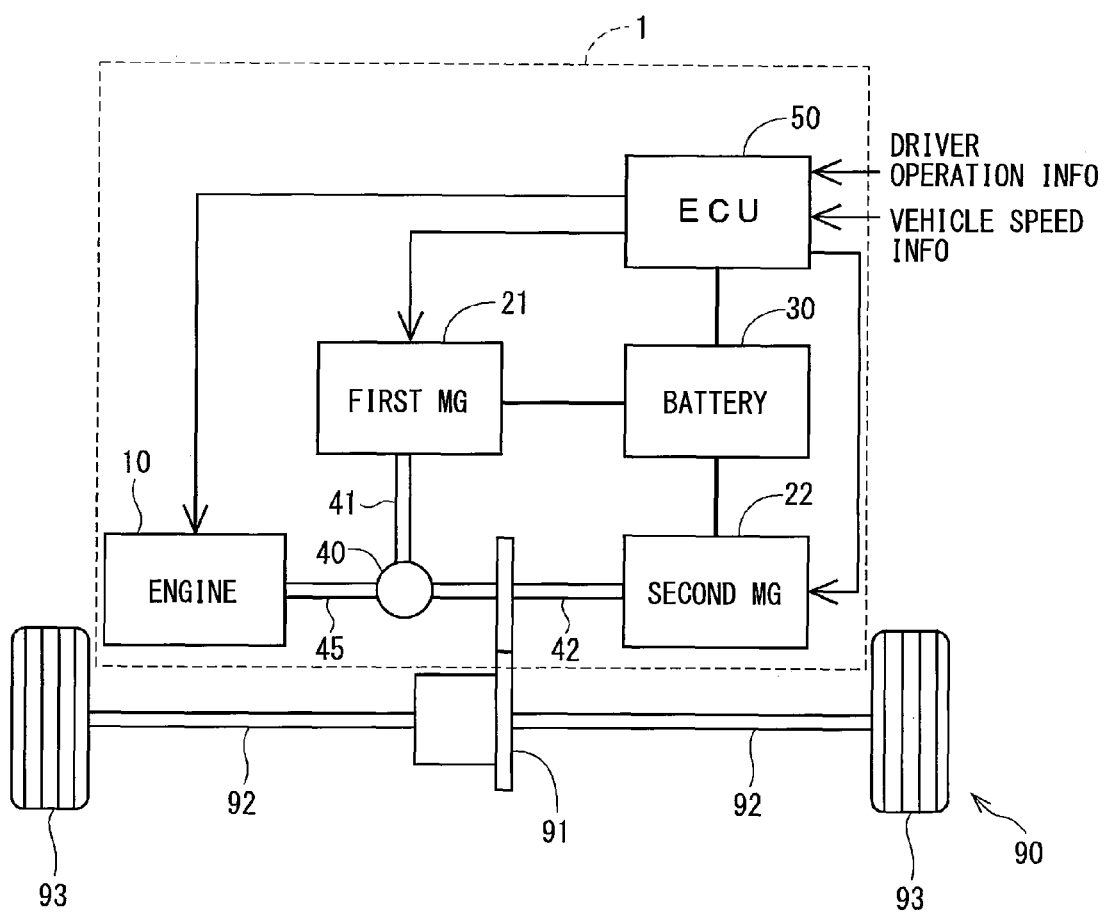
FIG. 1 is a block diagram illustrating a vehicle control system according to a first embodiment of the present disclosure.

As shown in FIG. 1, the vehicle control system 1 is mounted on a vehicle 90 and includes an engine 10, a first rotating electrical machine 21, a second rotating electrical machine 22, a battery 30, a driving-force dividing mechanism 40, and an ECU 50 as the vehicle control apparatus. In the drawings, the first rotating electrical machine 21 and the second rotating electrical machine 22 are denoted as "MG1" and "MG2", respectively.

The engine 10 is an internal-combustion engine with multiple cylinders and serves as a driving source of the vehicle 90 along with the first rotating electrical machine 21 and the second rotating electrical machine 22. The engine 10 rotates a drive shaft 92 of the vehicle 90 and a drive wheel 93 coupled to the drive shaft 92 through the dividing mechanism 40 and a reducer 91. The engine 10 causes the first rotating electrical machine 21 to serve as a power generator for generating electrical power to charge the battery 30.

Each of the first rotating electrical machine 21 and the second rotating electrical machine 22 is a so-called "motor generator (MG)" and has both a function as a motor for generating torque by rotating with electrical power supplied from the battery 30 and a function as a power generator for generating electric power by being driven by the engine 10 or by being driven when the vehicle 90 is braking. According to the first embodiment, each of the first rotating electrical machine 21 and the second rotating electrical machine 22 is a permanent magnet three-phase synchronous motor.

The first rotating electrical machine 21 is driven by the engine 10 and used mainly as a power generator. Electrical power generated by the first rotating electrical machine 21 is supplied to the battery 30 through an inverter (not shown), for example.

The second rotating electrical machine 22 is used mainly as a motor. In motoring, the second rotating electrical machine 22 functions as a motor and rotates the drive shaft 92 of the vehicle 90 and the drive wheel 93 through the reducer 91 by receiving electrical power from the battery 30 through an inverter (not shown), for example. In regeneration, the second rotating electrical machine 22 functions as a power generator, and electrical power generated by the second rotating electrical machine 22 is supplied to the battery 30 through an inverter (not shown), for example.

According to the first embodiment, the engine 10 is sometimes referred to the "first driving source", the first rotating electrical machine 21 is sometimes referred to the "second driving source", and the second rotating electrical machine 22 is sometimes referred to the "third driving source".

The battery 30 is a rechargeable power storage device such as an electric double-layer capacitor or a secondary battery such as a lithium-ion battery or a nickel hydride battery. The battery 30 is changed so that the state of charge (SOC) of the battery 30 can be within a predetermined range. The battery 30 is connected to and exchanges electric power with the first rotating electrical machine 21 and the second rotating electrical machine 22. Specifically, AC power generated by the first rotating electrical machine 21 and the second rotating electrical machine 22 is converted to DC power by an inverter, for example, and then stored in the battery 30. DC power of the battery 30 is converted to AC power by an inverter, for example, and then supplied mainly to the second rotating electrical machine 22.

Although not shown in the drawings, the dividing mechanism 40 is configured as a well-known planetary gear train having a sun gear, a ring gear, and a planetary carrier. According to the first embodiment, the sun gear is connected to a rotary shaft 41 of the first rotating electrical machine 21, the ring gear is connected to a rotary shaft 42 of the second rotating electrical machine 22, and the planetary carrier is connected to a crank shaft 45 of the engine 10. Thus, the rotary shaft 41 of the first rotating electrical machine 21, the rotary shaft 42 of the second rotating electrical machine 22, and the crank shaft 45 of the engine 10 are mechanically connected to one another through the dividing mechanism 40.

In the dividing mechanism 40, when the sun gear and the ring gear rotate with rotation of the planetary carrier, driving force of the engine 10 is divided into two forces, one of which drives the first rotating electrical machine 21, and the other of which is transmitted through the reducer 91 and drives the drive shaft 92 and the drive wheel 93.

In the dividing mechanism 40, when rotation speeds of two out of three axes, i.e., the sun gear, the ring gear, and the planetary carrier are determined, a rotation speed of the other axis is determined. That is, when two out of a rotation speed Ne of the engine 10, a rotation speed Ng of the first rotating electrical machine 21, and a rotation speed Nm of the second rotating electrical machine 22 are determined, the remaining one is determined.

Figure 2:
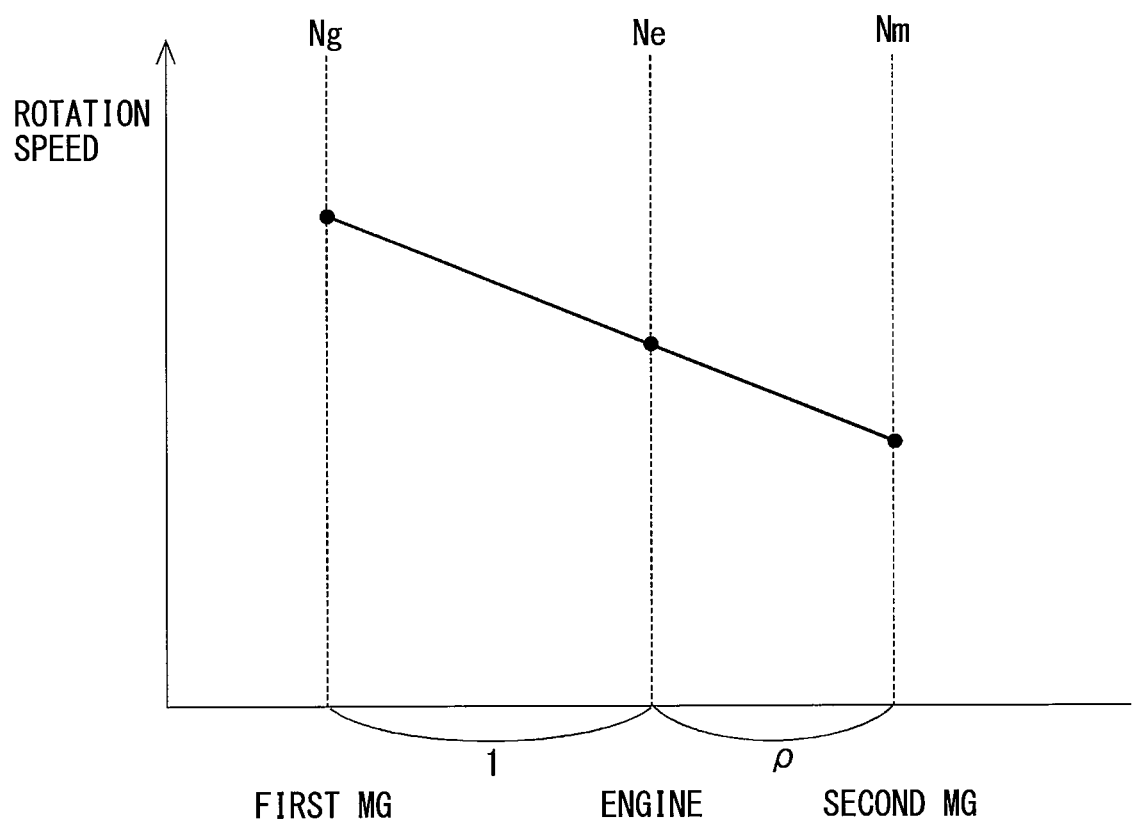
FIG. 2 is a collinear diagram for explaining behaviors of an engine, a first rotating electrical machine, and a second rotating electrical machine according to the first embodiment.

A relationship among the rotation speed Ne of the engine 10, the rotation speed Ng of the first rotating electrical machine 21, and the rotation speed Nm of the second rotating electrical machine 22 is described below with reference to a collinear diagram shown in FIG. 2. In FIG. 2, the longitudinal axis represents a rotation speed, and the horizontal axis represents a distance depending on a gear-tooth ratio of each gear.

As shown in FIG. 2, the rotation speed Ne of the engine 10, the rotation speed Ng of the first rotating electrical machine 21, and the rotation speed Nm of the second rotating electrical machine 22 are connected by a straight line on the collinear diagram.

The rotation speed Ne of the engine 10 is determined by internally dividing a line segment from the rotation speed Ng of the first rotating electrical machine 21 to the rotation speed Nm of the second rotating electrical machine 22 in a ratio of $1:\rho$, where $\rho$ represents a gear ratio of the number of teeth of the sun gear, which is connected to a rotary shaft 41 of the first rotating electrical machine 21, to the number of teeth of the ring gear, which is connected to the rotary shaft 42 of the second rotating electrical machine 22.

Referring back to FIG. 1, the ECU 50 is configured as a microcomputer, for example, and includes a CPU, a ROM, RAM, and an I/O which are connected through buses. The ECU 50 controls the whole of the vehicle 90 by software by executing prestored programs using the CPU or by hardware using a specific electronic circuit.

The ECU 50 receives driver operation information. According to the first embodiment, the driver operation information includes accelerator opening degree information from an accelerator sensor (not shown), brake information from a brake switch (not shown), and shift information from a transmission gear shift switch (not shown).

In addition, the ECU 50 receives vehicle speed information related to a running speed of the vehicle 90 and signals from other sensors and switches. Further, the ECU 50 receives battery information related to the battery 30. The battery information includes the SOC and the minimum temperature of cells of the battery 30. The ECU 50 controls the vehicle 90 based on these information and signals.

According to the first embodiment, the ECU 50 calculates a driver request torque command value Tp based on the driver operation information and the vehicle speed information. For example, the driver request torque command value Tp is torque necessary to rotate a propeller shaft (not shown) of the vehicle 90. Further, the ECU 50 divides the driver request torque command value Tp among an engine torque command value Te related to torque outputted by the engine 10, a MG1 torque command value Tg related to torque outputted by the first rotating electrical machine 21, and a MG2 torque command value Tm related to torque outputted by the second rotating electrical machine 22. These command values are used for control of the engine 10, the first rotating electrical machine 21, and the second rotating electrical machine 22.

Next, a command value calculating process is described with reference to a flowchart shown in FIG. 3. The ECU 50 executes the command value calculating process at a predetermined interval while ignition power of the vehicle 90 is ON.

Firstly, at S101, the ECU 50 reads the driver operation information and the vehicle information.

At S102, the ECU 50 calculates the driver request torque command value Tp based on the driver operation information and the vehicle information. For example, the driver request torque command value Tp is calculated by using a prestored map.

At S103, the ECU 50 calculates a first command value T1 based on the driver request torque command value Tp. According to the first embodiment, since the engine 10 is the first driving source, the first command value T1 is the engine torque command value Te. The engine torque command value Te is calculated based on the driver request torque command value Tp by referring a prestored map. The engine torque command value Te corresponds to torque which is used to drive the drive shaft 92 and the drive wheel 93 and not used to charge the battery 30. The same is true for an engine torque monitor value Tes and an engine torque monitor margin MRe which are described later.

At S104, the ECU 50 calculates a second command value T2. According to the first embodiment, since the first rotating electrical machine 21 is the second driving source, the second command value T2 is the MG1 torque command value Tg. The MG1 torque command value Tg is calculated based on the engine torque command value Te by the following formula (1):

$$Tg=-\{\rho/(1+\rho)\}\times Te \qquad (1)$$

At S105, the ECU 50 calculates a third command value T3. According to the first embodiment, since the second rotating electrical machine 22 is the third driving source, the third command value T3 is the MG2 torque command value Tm. The MG2 torque command value Tm is calculated based on the driver request torque command value Tp, the engine torque command value Te, and the MG1 torque command value Tg by the following formula (2):

$$Tm=Tp-\{1/(1+\rho)\}\times Te-(-1/\rho)\times Tg \qquad (2)$$

At S106, the ECU 50 determines whether the driver request torque command value Tp, the engine torque command value Te, the MG1 torque command value Tg, and the MG2 torque command value Tm have an abnormality that requires the ECU 50 to perform a fail-safe procedure. According to the first embodiment, the ECU 50 determines whether the abnormality occurs based on an abnormality flag which is described later. If the abnormality flag is not set, and the ECU 50 determines that the driver request torque command value Tp, the engine torque command value Te, the MG1 torque command value Tg, and the MG2 torque command value Tm do not have the abnormality that requires the ECU 50 to perform the fail-safe procedure corresponding to NO at S106, the ECU 50 proceeds to S107. In contrast, if the abnormality flag is set, and the ECU 50 determines that the driver request torque command value Tp, the engine torque command value Te, the MG1 torque command value Tg, and the MG2 torque command value Tm have the abnormality that requires the ECU 50 to perform the fail-safe procedure corresponding to YES at S106, the ECU 50 proceeds to S108.

At S107, the ECU 50 outputs the command values, thereby controlling the engine 10, the first rotating electrical machine 21, and the second rotating electrical machine 22 based on the command values.

At S108, the ECU 50 performs the fail-safe procedure.

Next, a monitor value calculating process is described with reference to a flowchart shown in FIG. 4. The monitor value calculating process is performed independently of the command value calculating process to monitor the abnormality in the driver request torque command value Tp, the engine torque command value Te, the MG1 torque command value Tg, and the MG2 torque command value Tm. In the monitor value calculating process, a driver request torque monitor value Tps, an engine torque monitor value Tes, a MG1 torque monitor value Tgs, and a MG2 torque monitor value Tms are calculated.

The ECU 50 executes the monitor value calculating process at a predetermined interval while the ignition power of the vehicle 90 is ON.

Firstly, at S201, the ECU 50 reads the driver operation information and the vehicle information.

At S202, the ECU 50 calculates the driver request torque monitor value Tps used to monitor the driver request torque command value Tp.

At S203, the ECU 50 calculates a first monitor value T1s. According to the first embodiment, the first monitor value T1s is the engine torque monitor value Tes used to monitor the engine torque command value Te.

At S204, the ECU 50 calculates a second monitor value T2s. According to the first embodiment, the second monitor value T2s is the MG1 torque monitor value Tgs used to monitor the MG1 torque command value Tg.

At S205, the ECU 50 calculates a third monitor value T3s. According to the first embodiment, the third monitor value T3s is the MG2 torque monitor value Tms used to monitor the MG2 torque command value Tm.

The monitor values calculated at S202, S203, S204, and S205 can be calculated in the same manner as the command values calculated at S102, S103, S104, and S105, respectively. Alternatively, the monitor values can be calculated in a different manner as the command values, for example, by using different formulas and parameters. For example, the monitor values can be calculated so that signs of the monitor values can be opposite to signs of the command values.

Next, an abnormality determining process for determining the abnormality in the driver request torque command value Tp, the engine torque command value Te, the MG1 torque command value Tg, and the MG2 torque command value Tm.

According to the first embodiment, an absolute value of a difference between the driver request torque command value Tp and the driver request torque monitor value Tps is calculated as a driver request torque excess amount Ep, and control is made so that the driver request torque excess amount Ep can be not greater than a driver request torque monitor margin MRp. That is, the driver request torque monitor margin MRp is an abnormality detecting threshold related to the difference between the driver request torque command value Tp and the driver request torque monitor value Tps. The driver request torque monitor margin MRp is set based on an allowable variation range of acceleration allowed in the event of sudden acceleration or deceleration.

For example, the driver request torque monitor margin MRp is set as an allowable variation of acceleration appearing when a driver of the vehicle 90 depresses an accelerator pedal of the vehicle 90 so that a sudden acceleration can occur.

In this case, if the driver request torque command value Tp does not exceed the sum of the driver request torque monitor value Tps and the driver request torque monitor margin MRp, it is determined that the driver request torque command value Tp does not have the abnormality because the driver request torque command value Tp does not cause an abnormal sudden acceleration of the vehicle 90. In contrast, if the driver request torque command value Tp exceeds the sum of the driver request torque monitor value Tps and the driver request torque monitor margin MRp, it is determined that the driver request torque command value Tp has the abnormality which requires the fail-safe procedure to be performed because the driver request torque command value Tp may cause the abnormal sudden acceleration. Likewise, based on the accelerator opening degree information and the shift information, the driver request torque monitor margin MRp is set as an allowable variation of deceleration appearing when a driver of the vehicle 90 depresses a brake accelerator pedal of the vehicle 90 or reveres a moving direction of the vehicle 90 so that a sudden deceleration can occur.

As described above, the driver request torque command value Tp is divided among the engine torque command value Te, the MG1 torque command value Tg, and the MG2 torque command value Tm.

Therefore, according to the first embodiment, an engine torque monitor margin MRe related to the monitoring of the engine torque command value Te, a MG1 torque monitor margin MRg related to the monitoring of the MG1 torque command value Tg, and a MG2 torque monitor margin MRm related to the monitoring of the MG2 torque command value Tm are calculated based on the driver request torque monitor margin MRp to determine the abnormality in the engine torque command value Te, the MG1 torque command value Tg, and the MG2 torque command value Tm.

According to the first embodiment, when a difference between the engine torque command value Te and the engine torque monitor value Tes exceeds the engine torque monitor margin MRe, it is determined that the engine torque command value Te has the abnormality which requires the fail-safe process to be performed. Likewise, when a difference between the MG1 torque command value Tg and the MG1 torque monitor value Tgs exceeds the MG1 torque monitor margin MRg, it is determined that the MG1 torque command value Tg has the abnormality which requires the fail-safe process to be performed. Likewise, when a difference between the MG2 torque command value Tm and the MG2 torque monitor value Tms exceeds the MG2 torque monitor margin MRm, it is determined that the MG2 torque command value Tm has the abnormality which requires the fail-safe process to be performed. The "abnormality which requires the fail-safe process to be performed" means that since the command value for each driving source varies beyond an allowable margin, an undesirable situation, such as a sudden acceleration or deceleration, which may cause the driver to feel unconformable, is likely to occur if the driving source is controlled based on the command value.

According to the first embodiment, the engine torque monitor margin MRe, the MG1 torque monitor margin MRg, and the MG2 torque monitor margin MRm are calculated by sequentially converting the driver request torque monitor margin MRp using conversion formulas.

Next, the abnormality determining process using the monitor margins is described with reference to a flowchart shown in FIG. 5. The ECU 50 executes the abnormality determining process at a predetermined interval while the ignition power of the vehicle 90 is ON.

At S301, the ECU 50 sets the driver request torque monitor margin MRp. According to the first embodiment, a candidate having the minimum absolute value among possible candidates including a sudden acceleration, a sudden deceleration, and a reverse movement is set as the driver request torque monitor margin MRp.

At S302, the ECU 50 calculates the driver request torque excess amount Ep. The driver request torque excess amount Ep is calculated as the absolute value of the difference between the driver request torque command value Tp and the driver request torque monitor value Tps.

At S303, the ECU 50 calculates a value by subtracting the driver request torque excess amount Ep from the driver request torque monitor margin MRp.

At S304, the ECU 50 determines whether the value calculated at S303 is smaller than zero. If the value calculated at S303 is smaller than zero corresponding to YES at S304, the ECU 50 proceeds to S318. In contrast, if the value calculated at S303 is not smaller than zero corresponding to NO at S304, the ECU 50 proceeds to S305.

At S305, the ECU 50 calculates a first monitor margin MR1 by converting the value calculated at S303 to a value corresponding to torque of the first driving source. According to the first embodiment, since the first driving source is the engine 10, the first monitor margin MR1 is the engine torque monitor margin MRe. The engine torque monitor margin MRe is calculated based on the value calculated at S303 by referring to a prestored map. Alternatively, the engine torque monitor margin MRe can be calculated by using a formula.

At S306, the ECU 50 calculates a first excess amount E1. According to the first embodiment, the first excess amount E1 is an engine torque excess amount Ee which is an absolute value of a difference between the engine torque command value Te and the engine torque monitor value Tes.

At S307, the ECU 50 calculates a value by subtracting the first excess amount E1 from the first monitor margin MR1.

At S308, the ECU 50 determines whether the value calculated at S307 is smaller than zero. If the value calculated at S307 is smaller than zero corresponding to YES at S308, the ECU 50 proceeds to S318. In contrast, if the value calculated at S307 is not smaller than zero corresponding to NO at S308, the ECU 50 proceeds to S309.

At S309, the ECU 50 calculates a second monitor margin MR2 by converting the value calculated at S307 to a value corresponding to torque of the second driving source. According to the first embodiment, since the second driving source is the first rotating electrical machine 21, the second monitor margin MR2 is the MG1 torque monitor margin MRg.

The MG1 torque monitor margin MRg is calculated by the following formula (3):

$$MRg=\{\rho/(1+\rho)\} \times (MRe-Ee) \qquad (3)$$

At S310, the ECU 50 calculates a second excess amount E2. According to the first embodiment, the second excess amount E2 is a MG1 torque excess amount Eg which is an absolute value of a difference between the MG1 torque command value Tg and the MG1 torque monitor value Tgs.

At S311, the ECU 50 calculates a value by subtracting the second excess amount E2 from the second monitor margin MR2.

At S312, the ECU 50 determines whether the value calculated at S311 is smaller than zero. If the value calculated at S311 is smaller than zero corresponding to YES at S312, the ECU 50 proceeds to S318. In contrast, if the value calculated at S311 is not smaller than zero corresponding to NO at S312, the ECU 50 proceeds to S313.

At S313, the ECU 50 calculates a third monitor margin MR3 by a conversion to a value corresponding to torque of the third driving source using the second monitor margin MR2. According to the first embodiment, since the third driving source is the second rotating electrical machine 22, the third monitor margin MR3 is the MG2 torque monitor margin MRm.

The MG2 torque monitor margin MRm is calculated by the following formula (4):

$$MRm=MRp-Ep-\{1/(1+\rho)\} \times Ee-(-1/\rho) \times Eg \qquad (4)$$

At S314, the ECU 50 calculates a third excess amount E3. According to the first embodiment, the third excess amount E3 is a MG2 torque excess amount Em which is an absolute value of a difference between the MG2 torque command value Tm and the MG2 torque monitor value Tms.

At S315, the ECU 50 calculates a value by subtracting the third excess amount E3 from the third monitor margin MR3.

At S316, the ECU 50 determines whether the value calculated at S315 is smaller than zero. If the value calculated at S315 is smaller than zero corresponding to YES at S316, the ECU 50 proceeds to S318. In contrast, if the value calculated at S315 is not smaller than zero corresponding to NO at S316, the ECU 50 proceeds to S317.

At S317, the ECU 50 determines that none of the driver request torque command value Tp, the engine torque command value Te, the MG1 torque command value Tg, and the MG2 torque command value Tm has the abnormality that requires the fail-safe procedure to be performed. In contrast, at S318, to which the ECU 50 proceeds when the value calculated by subtracting the driver request torque excess amount Ep from the driver request torque monitor margin MRp, the value calculated by subtracting the first excess amount E1 from the first monitor margin MR1, the value calculated by subtracting the second excess amount E2 from the second monitor margin MR2, or the value calculated by subtracting the third excess amount E3 from the third monitor margin MR3 is smaller than zero (corresponding to YES at S304, at S308, at S312, or at S316), the ECU 50 determines that the abnormality that requires the fail-safe procedure to be performed occurs and sets the abnormality flag. The abnormality flag is used at S106 in FIG. 3 to determine the abnormality.

Figure 6A:
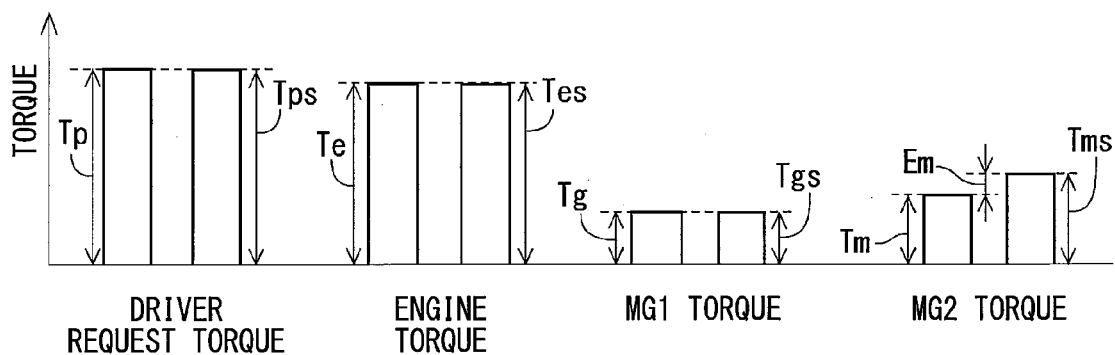
FIGS. 6A and 6B are diagrams for explaining the abnormality determining process according to the first embodiment.
Figure 6B:
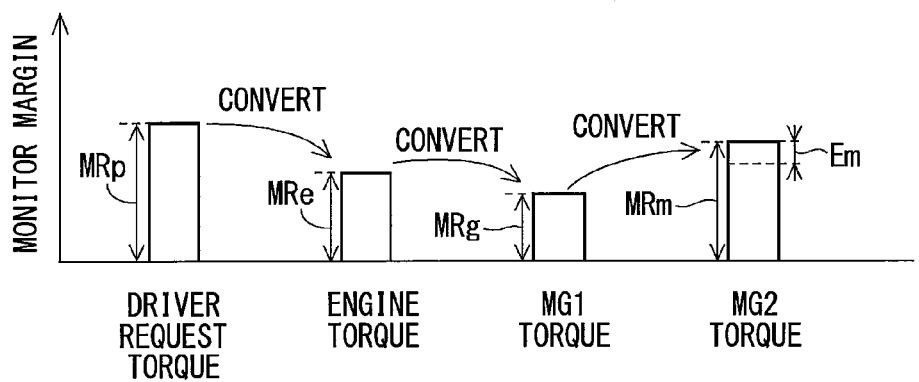
Figure 7A:
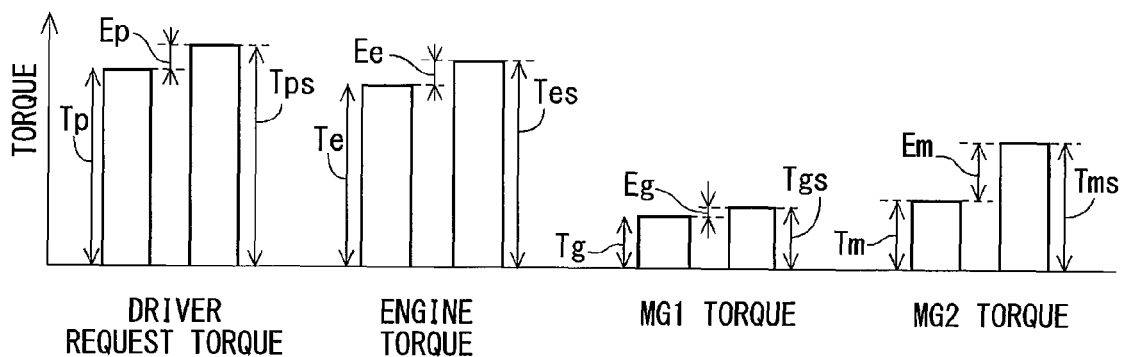
FIGS. 7A and 7B are diagrams for explaining the abnormality determining process according to the first embodiment.
Figure 7B:
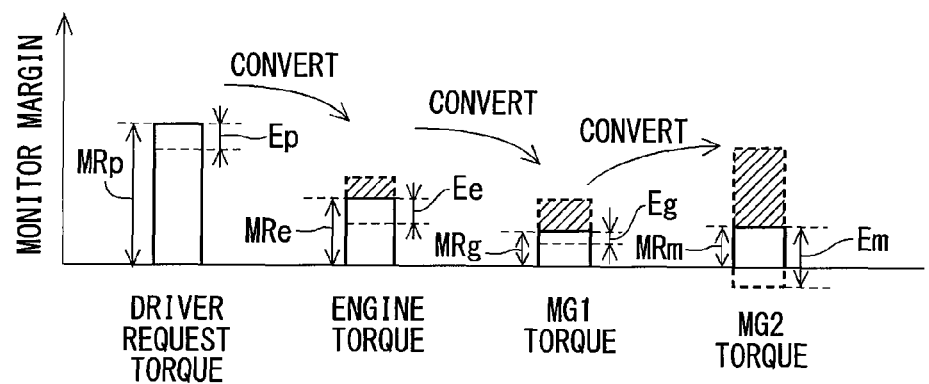

Next, concrete examples of the abnormality determining process are described with reference to FIGS. 6A and 6B and FIGS. 7A and 7B. FIGS. 6A and 7A show a comparison between the command value and the monitor value. FIGS. 6B and 7B show the monitor margin. The same is true for corresponding drawings in embodiments described later.

FIGS. 6A and 6B show a normal case where it is determined that the abnormality does not occur. In this example, as shown in FIG. 6A, regarding the driver request torque, the engine torque, and the MG1 torque, the command value is equal to the monitor value. Therefore, all of the driver request torque excess amount Ep, the engine torque excess amount Ee, and the MG1 torque excess amount Eg are zero.

Regarding the MG2 torque, the MG2 torque monitor value Tms is greater than the MG2 torque command value Tm by the MG2 torque excess amount Em.

As shown in FIG. 6B, the driver request torque monitor margin MRp is sequentially converted to the engine torque monitor margin MRe, the MG1 torque monitor margin MRg, and the MG2 torque monitor margin MRm. In this case, since the value calculated by subtracting the MG2 torque excess amount Em from the MG2 torque monitor margin MRm is not smaller than zero (corresponding to NO at S316 in FIG. 5), it is determined at S317 in FIG. 5 that the abnormality does not occur, and the fail-safe procedure is not performed.

FIGS. 7A and 7B show an abnormal case where it is determined that the abnormality occurs. In FIG. 7B, a portion hatched with diagonal lines indicates the amount of reduction in the monitor margin due to the excess amount which is the absolute value of the difference between the command value and the monitor value.

In this example, as shown in FIG. 7A, the driver request torque monitor value Tps is greater than the driver request torque command value Tp by the driver request torque excess amount Ep, the engine torque monitor value Tes is greater than the engine torque command value Te by the engine torque excess amount Ee, the MG1 torque monitor value Tgs is greater than the MG1 torque command value Tg by the MG1 torque excess amount Eg, and the MG2 torque monitor value Tms is greater than the MG2 torque command value Tm by the MG2 torque excess amount Em.

As shown in FIG. 7B, the driver request torque monitor margin MRp is sequentially converted to the engine torque monitor margin MRe, the MG1 torque monitor margin MRg, and the MG2 torque monitor margin MRm. At this time, the monitor margin decreases by the amount corresponding to the driver request torque excess amount Ep, the engine torque excess amount Ee, and the MG1 torque excess amount Eg, and the value calculated by subtracting the MG2 torque excess amount Em from the MG2 torque monitor margin MRm becomes smaller than zero (corresponding to YES at S316 in FIG. 5). Therefore, it is determined at S318 in FIG. 5 that the abnormality occurs. Accordingly, the fail-safe procedure is performed at S108 in FIG. 3.

In the example shown in FIG. 7B, it is determined that the abnormality occurs due to the fact that the value calculated by subtracting the MG2 torque excess amount Em from the MG2 torque monitor margin MRm is smaller than zero. However, if the value calculated by subtracting the driver request torque excess amount Ep from the driver request torque monitor margin MRp, the value calculated by subtracting the engine torque excess amount Ee from the engine torque monitor margin MRe, or the value calculated by subtracting the MG1 torque excess amount Eg from the MG1 torque monitor margin MRg becomes smaller than zero before the subtraction of the MG2 torque excess amount Em from the MG2 torque monitor margin MRm is performed, it is determined at that time that the abnormality occurs, and the fail-safe procedure is performed.

As described above, according to the first embodiment, the ECU 50 controls the vehicle 90 equipped with multiple driving sources including the engine 10, the first rotating electrical machine 21, and the second rotating electrical machine 22.

Figure 3:
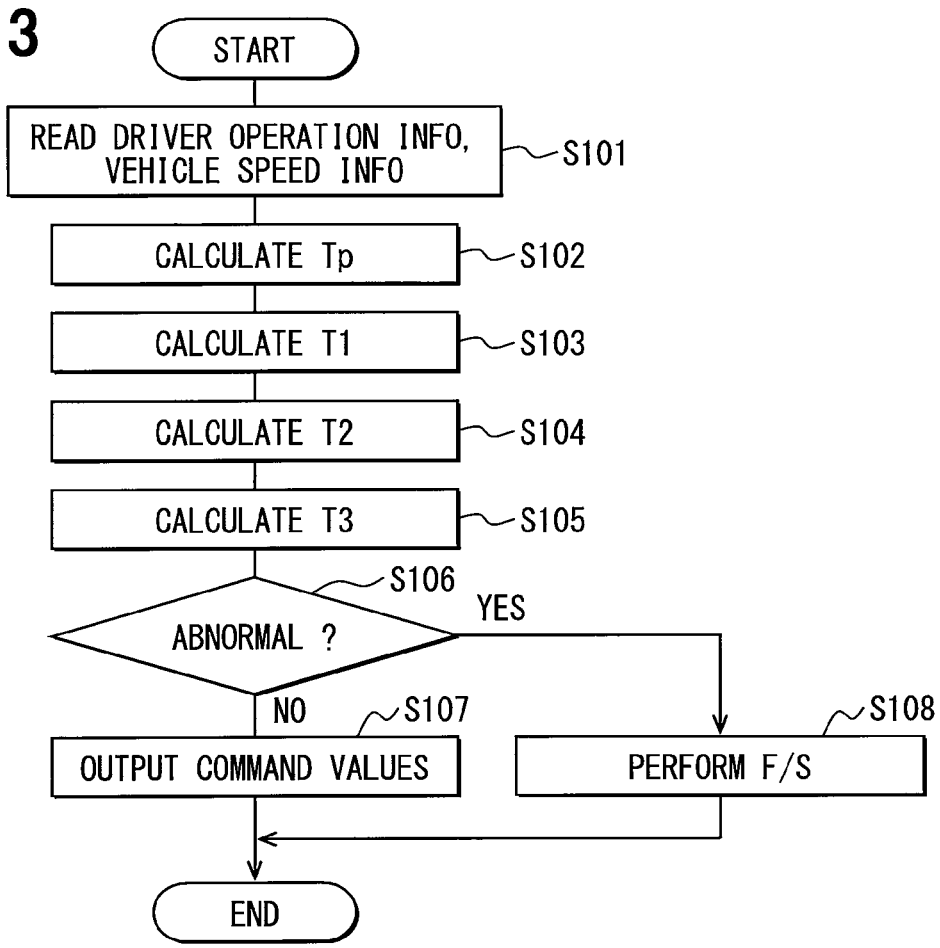
FIG. 3 is a flowchart for explaining a command value calculating process according to the first embodiment.

The ECU 50 calculates the driver request torque command value Tp based on the driver operation information (at S102 in FIG. 3).

The ECU 50 divides the driver request torque command value Tp among the driving sources and calculates driving-source command values as command values to separately control the driving sources (at S103, S104, and S105). The ECU 50 calculates the driver request torque monitor value Tps used to monitor the abnormality in the driver request torque command value Tp and driving-source monitor values used to monitor the abnormality in the driving-source command values (at S202, S203, S204, and S205 in FIG. 4).

Figure 5:
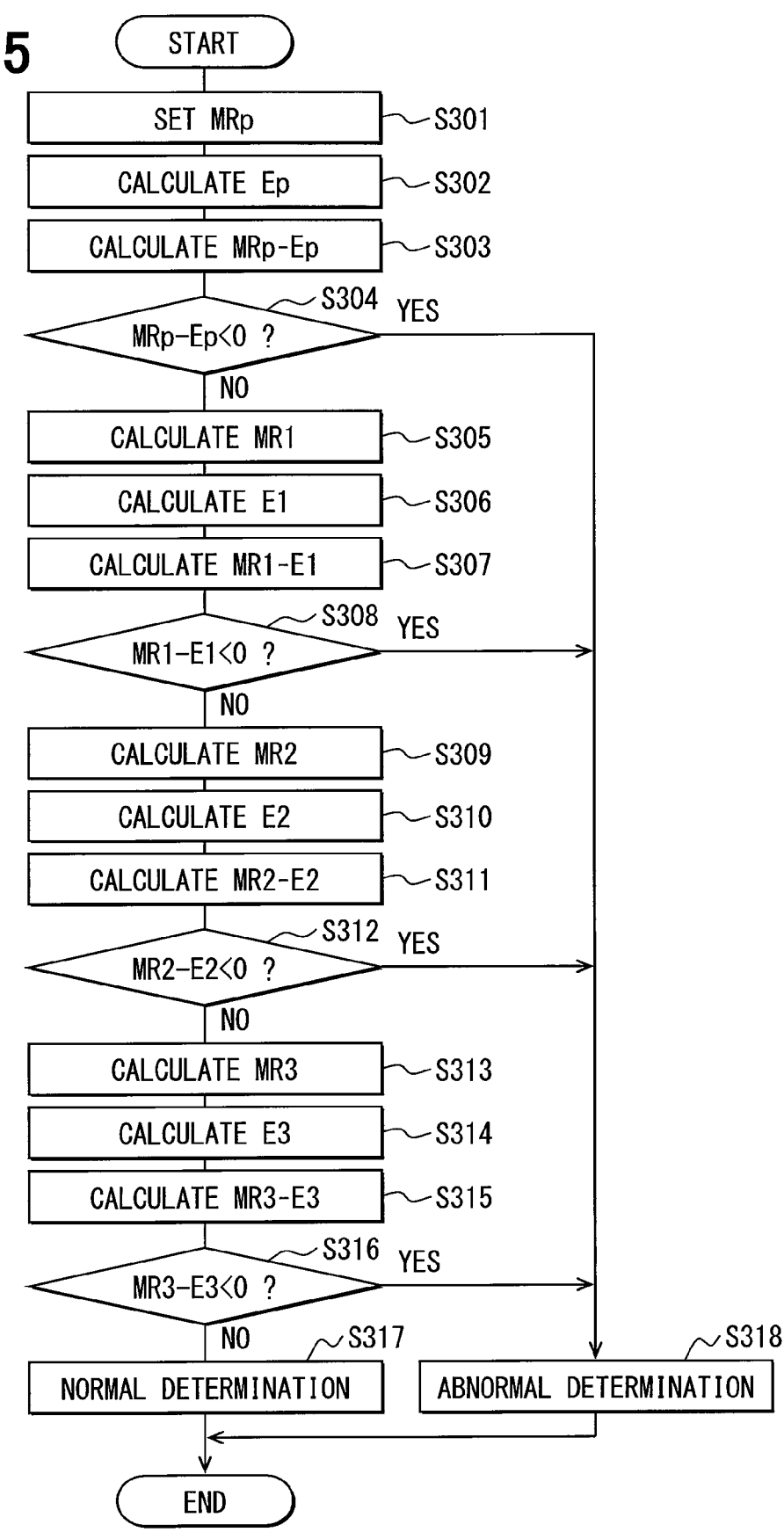
FIG. 5 is a flowchart for explaining an abnormality determining process according to the first embodiment.

The ECU 50 sets the driver request torque monitor margin MRp related to the abnormality determination based on the driver request torque excess amount Ep which is the difference between the driver request torque command value Tp and the driver request torque monitor value Tps (at S301 in FIG. 5).

The ECU 50 calculates driving-source monitor margins based on the driver request torque monitor margin MRp (at S305, S309, and S313). The driving-source monitor margin is related to the abnormality determination based on a driving-source excess amount which is a difference between the driving-source command value and the driving-source monitor value.

Then, the ECU 50 determines the abnormality in the driving-source command value by using the driving-source monitor margin.

According to the first embodiment, the driver request torque monitor margin MRp is set, the driving-source monitor margin is calculated based on the driver request torque monitor margin MRp, and the abnormality in the driving-source command value is determined by using the driving-source monitor margin. In such an approach, the abnormality in the driving-source command value can determined before the driving-source command value is outputted to the driving source without using a control result (e.g., actual torque) which is obtained by actually controlling the driving source with the driving-source command value. Further, since it is possible to prevent the driving source from being driven by the abnormal driving-source command value, it is possible to prevent torque exceeding the driver request torque monitor margin MRp from being outputted. Therefore, it is possible to prevent the driver from feeling uncomfortable.

When the sum of the driving-source command values is not equal to the driver request torque command value Tp, it may be determined that the abnormality occurs in the driving-source command value. In this case, even when the sum of the driving-source command values does not exceed the driver request torque monitor margin MRp, it may be determined that the abnormality occurs in the driving-source command value. According to the first embodiment, the driver request torque monitor margin MRp is set based on the allowable variation range of acceleration allowed in the event of sudden acceleration or deceleration, and the driving-source monitor margins are calculated based on the driver request torque monitor margin MRp. Thus, it is possible to determine whether the abnormality occurs in the driving-source command value more adequately.

According to the first embodiment, two rotating electrical machines 21 and 22 are included as the driving sources. One of the engine 10, the first rotating electrical machine 21, and the second rotating electrical machine 22 is the first driving source, another is the second driving source, and the other is the third driving source. According to the first embodiment, the first driving source is the engine 10, the second driving source is the first rotating electrical machine 21, and the third driving source is the second rotating electrical machine 22.

As the driving-source command values, the ECU 50 calculates the engine torque command value Te used to control the engine 10, the MG1 torque command value Tg used to control the first rotating electrical machine 21, and the MG2 torque command value Tm used to control the second rotating electrical machine 22.

As the driving-source monitor values, the ECU 50 calculates the engine torque monitor value Te used to monitor the abnormality in the engine torque command value Te, the MG1 torque monitor value Tgs used to monitor the abnormality in the MG1 torque command value Tg, and the MG2 torque monitor value Tms used to monitor the abnormality in the MG2 torque command value Tm.

Further, as the driving-source monitor margins, the ECU 50 calculates the engine torque monitor margin MRe related to the abnormality determination based on the engine torque excess amount Ee which is the difference between the engine torque command value Te and the engine torque monitor value Tes, the MG1 torque monitor margin MRg related to the abnormality determination based on the MG1 torque excess amount Eg which is the difference between the MG1 torque command value Tg and the MG1 torque monitor value Tgs, and the MG2 torque monitor margin MRm related to the abnormality determination based on the MG2 torque excess amount Em which is the difference between the MG2 torque command value Tm and the MG2 torque monitor value Tms.

According to the first embodiment, the engine torque monitor margin MRe, the MG1 torque monitor margin MRg, and the MG2 torque monitor margin MRm are calculated based on the driver request torque monitor margin MRp. Thus, it is possible to suitably determine the abnormality in the engine torque command value Te, the MG1 torque command value Tg, and the MG2 torque command value Tm based on the engine torque monitor margin MRe, the MG1 torque monitor margin MRg, and the MG2 torque monitor margin MRm.

Further, it is possible to determine the abnormality in the engine torque command value Te, the MG1 torque command value Tg, and the MG2 torque command value Tm, before the engine torque command value Te is outputted to the engine 10, the MG1 torque command value Tg is outputted to the first rotating electrical machine 21, and the MG2 torque command value Tm is outputted to the second rotating electrical machine 22.

The ECU 50 calculates the driving-source monitor margins based on the value, which is calculated by subtracting the driver request torque excess amount Ep from the driver request torque monitor margin MRp, using conversion formulas.

Specifically, the engine torque monitor margin MRe, the MG1 torque monitor margin MRg, and the MG2 torque monitor margin MRm are sequentially calculated based on the value, which is calculated by subtracting the driver request torque excess amount Ep from the driver request torque monitor margin MRp, using conversion formulas. It is noted that using conversion formulas include referring to a prestored map.

According to the first embodiment, the driver request torque monitor margin MRp is sequentially converted to each driving-source monitor margin. Therefore, even if the excess amount in one driving source is relatively large, it is not determined that the abnormality occurs when the excess amount in another driving source is so small that the excess amount as a whole cannot exceed the monitor margin. Thus, the driver request torque monitor margin MRp can be used with high efficiency.

When the driving-source excess amount exceeds the driving-source monitor margin, the ECU 50 determines that the abnormality occurs in the driving-source command value. Specifically, when the engine torque excess amount Ee exceeds the engine torque monitor margin MRe (YES at S308), when the MG1 torque excess amount Eg exceeds the MG1 torque monitor margin MRg (YES at S312), or when the MG2 torque excess amount Em exceeds the MG2 torque monitor margin MRm (YES at S316), the ECU 50 determines that the abnormality occurs in at least one of the engine torque command value Te, the MG1 torque command value Tg, and the MG2 torque command value Tm.

Thus, it is possible to adequately determine whether the abnormality occurs in the engine torque command value Te, the MG1 torque command value Tg, and the MG2 torque command value Tm.

The ECU 50 sets the candidate having the minimum absolute value among prestored candidates as the driver request torque monitor margin MRp. For example, possible values including a sudden acceleration, a sudden deceleration, and a reverse movement are prestored as candidates for the driver request torque monitor margin MRp. According to the first embodiment, since it is impossible to determine which of the command value and the monitor value has the abnormality, it is impossible to determine which of acceleration and deceleration causes the abnormality. For this reason, the candidate having the minimum absolute value among the candidates is set as the driver request torque monitor margin MRp so that functional safety can be ensured.

Correspondence between terms used in the first embodiment and claims is as follows. The ECU 50 corresponds to a driver request torque command value calculating device, a driving-source command value calculating device, a monitor value calculating device, a driver request torque monitor margin setting device, a driving-source monitor margin calculating device, and an abnormality determining device.

S102 in FIG. 3 corresponds to a function of the driver request torque command value calculating device. S103, S104, and S105 in FIG. 3 correspond to a function of the driving-source command value calculating device. S202, S203, S204, and S205 in FIG. 4 correspond to a function of the monitor value calculating device. S301 in FIG. 5 corresponds to a function of the driver request torque monitor margin setting device. S305, S309, and S313 in FIG. 5 correspond to a function of the driving-source monitor margin calculating device. S318 in FIG. 5 corresponds to a function of the abnormality determining device.

The engine 10, the first rotating electrical machine 21, and the second rotating electrical machine 22 correspond to driving sources. The engine torque command value Te, the MG1 torque command value Tg, and the MG2 torque command value Tm correspond to driving-source command values. Specifically, the engine torque command value Te corresponds to a first command value, the MG1 torque command value Tg corresponds to a second command value, and the MG2 torque command value Tm corresponds to a third command value.

The engine torque monitor value Tes, the MG1 torque monitor value Tgs, and the MG2 torque monitor value Tms correspond to driving-source monitor values. Specifically, the engine torque monitor value Tes corresponds to a first monitor value, the MG1 torque monitor value Tgs corresponds to a second monitor value, and the MG2 torque monitor value Tms corresponds to a third monitor value.

The engine torque excess amount Ee, the MG1 torque excess amount Eg, and the MG2 torque excess amount Em correspond to driving-source excess amounts. Specifically, the engine torque excess amount Ee corresponds to a first excess amount, the MG1 torque excess amount Eg corresponds to a second excess amount, and the MG2 torque excess amount Em corresponds to a third excess amount.

The engine torque monitor margin MRe, the MG1 torque monitor margin MRg, and the MG2 torque monitor margin MRm correspond to driving-source monitor margins. Specifically, the engine torque monitor margin MRe corresponds to a first monitor margin, the MG1 torque monitor margin MRg corresponds to a second monitor margin, and the MG2 torque monitor margin MRm corresponds to a third monitor margin.

Second Embodiment

A vehicle control system 2 including a vehicle control apparatus according to a second embodiment of the present disclosure is described below with reference to FIGS. 8-13B. The second embodiment differs from the first embodiment as follows.

Figure 8:
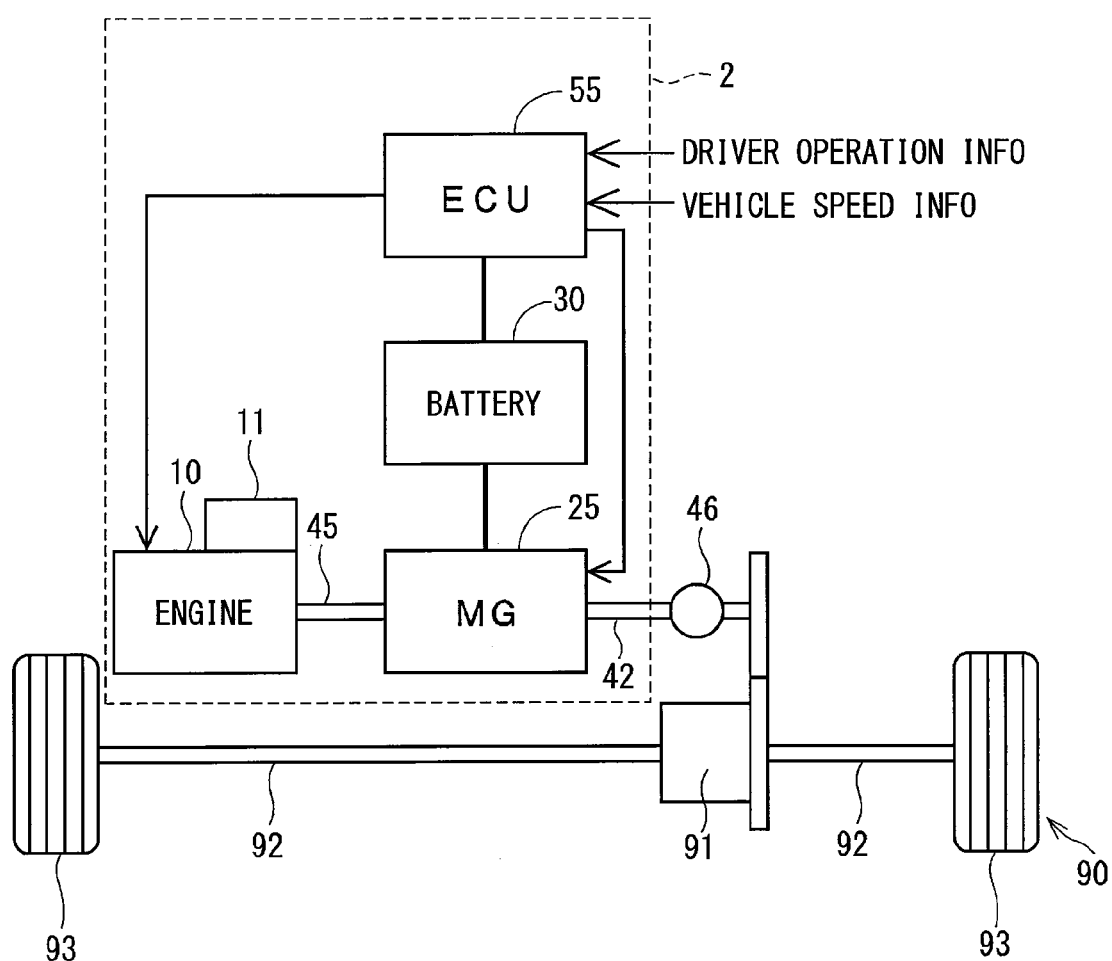
FIG. 8 is a block diagram illustrating a vehicle control system according to a second embodiment of the present disclosure.

Although the vehicle control system 1 of the first embodiment includes two rotating electrical machines, the vehicle control system 2 of the second embodiment includes one rotating electrical machine. As shown in FIG. 8, the vehicle control system 2 is mounted on the vehicle 90 and includes the engine 10, a rotating electrical machine 25, the battery 30, a transmission 46, and an ECU 55 as the vehicle control apparatus.

The engine 10 can be started by not only the rotating electrical machine 25 but also a starter 11. The crank shaft 45 of the engine 10 is directly connected to a rotary shaft 42 of the rotating electrical machine 25, and the driving force of the engine 10 is transmitted from the crank shaft 45 to the drive shaft 92 through the rotary shaft 42, the transmission 46, and the reducer 91.

The rotating electrical machine 25 is configured in substantially the same manner as the second rotating electrical machine 22 of the first embodiment. In motoring, the rotating electrical machine 25 rotates the drive shaft 92 of the vehicle 90 and the drive wheel 93 through the reducer 91 by receiving electrical power from the battery 30 through an inverter (not shown), for example. In regeneration, the rotating electrical machine 25 functions as a power generator, and electrical power generated by the rotating electrical machine 25 is supplied to the battery 30 through an inverter (not shown), for example.

According to the second embodiment, the engine 10 corresponds to a first driving source, and the rotating electrical machine 25 corresponds to a second driving source.

Base on the driver request torque command value Tp, the ECU 55 calculates an engine torque command value Te related to torque outputted by the engine 10 and a MG torque command value Tn related to torque outputted by the rotating electrical machine 25. These command values are used for control of the engine 10 and the rotating electrical machine 25.

Next, a command value calculating process according to the second embodiment is described with reference to a flowchart shown in FIG. 9. The ECU 55 executes the command value calculating process at a predetermined interval while the ignition power of the vehicle 90 is ON.

Procedures performed at S111, S112, and S113 are the same as the procedures performed at S101, S102, and S103 in FIG. 3, respectively.

At S114, the ECU 55 calculates a second command value T2. According to the second embodiment, since the rotating electrical machine 25 is the second driving source, the second command value T2 is the MG torque command value Tn. The MG torque command value Tn is calculated from a formula (5) below based on the engine torque command value Te. In the formula (5), $\rho^*$ represents a gear ratio between the engine 20 and the rotating electrical machine 25:

$$Tn = Tp - \rho^* \times Te \quad (5)$$

Procedures performed at S115, S116, and S117 are the same as the procedures performed at S106, S107, and S108 in FIG. 3, respectively.

Figure 10:
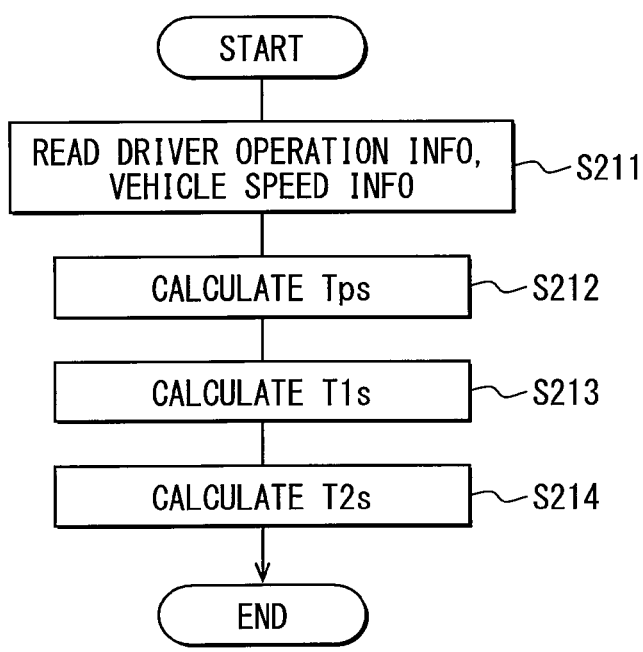
FIG. 10 is a flowchart for explaining a monitor value calculating process according to the second embodiment.

Next, a monitor value calculating process according to the second embodiment is described with reference to a flowchart shown in FIG. 10. The monitor value calculating process is performed independently of the command value calculating process to monitor the abnormality in the driver request torque command value Tp, the engine torque command value Te, and the MG torque command value Tn. In the monitor value calculating process, the driver request torque monitor value Tps, the engine torque monitor value Tes, and a MG torque monitor value Tns are calculated.

The ECU 55 executes the monitor value calculating process at a predetermined interval while the ignition power of the vehicle 90 is ON.

Figure 4:
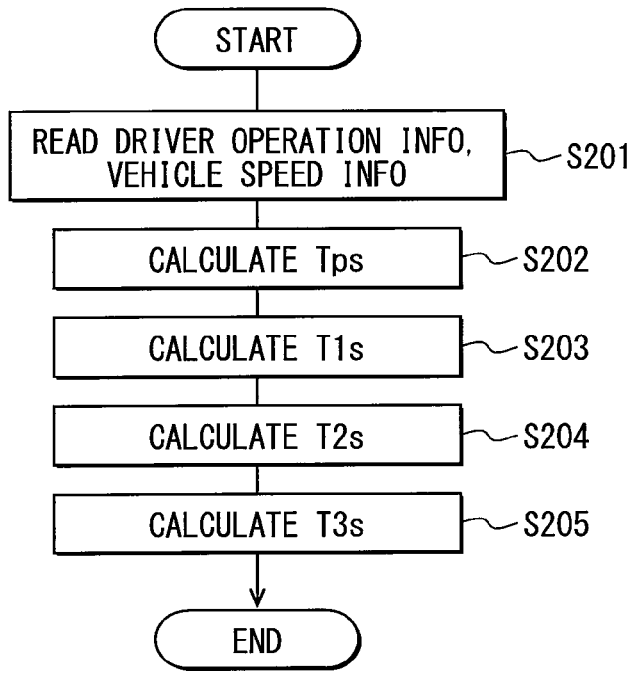
FIG. 4 is a flowchart for explaining a monitor value calculating process according to the first embodiment.

Procedures performed at S211, S212, and S213 are the same as the procedures performed at S201, S202, and S203 in FIG. 4, respectively.

At S214, the ECU 55 calculates a second monitor value T2s. According to the second embodiment, the second monitor value T2s is the MG torque monitor value Tns used to monitor the MG torque command value Tn.

The monitor values calculated at S212, S213, and S214 can be calculated in the same manner as the command values calculated at S112, S113, and S114, respectively. Alternatively, the monitor values can be calculated in a different manner as the command values, for example, by using different formulas and parameters. For example, the monitor values can be calculated so that signs of the monitor values can be opposite to signs of the command values.

Next, an abnormality determining process for determining the abnormality in the driver request torque command value Tp, the engine torque command value Te, and the MG torque command value Tn.

According to the second embodiment, an engine torque monitor margin MRe related to the monitoring of the engine torque command value Te and a MG torque monitor margin MRn related to the monitoring of the MG torque command value Tn are calculated based on the driver request torque monitor margin MRp to determine the abnormality in the engine torque command value Te and the MG torque command value Tn.

The engine torque monitor margin MRe and the MG torque monitor margin MRn are calculated by sequentially converting the driver request torque monitor margin MRp using conversion formulas.

Next, the abnormality determining process using the monitor margins is described with reference to a flowchart shown in FIG. 11. The ECU 55 executes the abnormality determining process at a predetermined interval while the ignition power of the vehicle 90 is ON.

Procedures performed at S401, S402, S403, S404, S405, S406, S407, and S408 are the same as the procedures performed at S301, S302, S303, S304, S305, S306, S307, and S308 in FIG. 5, respectively. It is noted that if an affirmative determination is made at S404 or S408, the ECU 55 proceeds to S414.

At S409, to which the ECU 55 proceeds if the value calculated by subtracting the first excess amount E1 from the first monitor margin MR1 is not smaller than zero, the ECU 55 calculates a second monitor margin MR2. The second monitor margin MR2 is converted to a value corresponding to torque of the second driving source by using the first monitor margin MR1.

According to the second embodiment, since the second driving source is the rotating electrical machine 25, the second monitor margin MR2 is the MG torque monitor margin MRn. The MG torque monitor margin MRn is calculated by the following formula (6):

$$MRn = MRp - Ep - \rho^* \times Ee \quad (6)$$

At S410, the ECU 55 calculates a second excess amount E2. According to the second embodiment, the second excess amount E2 is a MG torque excess amount En which is an absolute value of a difference between the MG torque command value Tn and the MG torque monitor value Tns.

At S411, the ECU 55 calculates a value by subtracting the second excess amount E2 from the second monitor margin MR2.

At S412, the ECU 55 determines whether the value calculated at S411 is smaller than zero. If the value calculated at S411 is smaller than zero corresponding to YES at S412, the ECU 55 proceeds to S414. In contrast, if the value calculated at S411 is not smaller than zero corresponding to NO at S412, the ECU 55 proceeds to S413.

At S413, the ECU 55 determines that none of the driver request torque command value Tp, the engine torque command value Te, and the MG torque command value Tn has the abnormality that requires the fail-safe procedure to be performed. In contrast, at S414, to which the ECU 55 proceeds when the value calculated by subtracting the driver request torque excess amount Ep from the driver request torque monitor margin MRp, the value calculated by subtracting the first excess amount E1 from the first monitor margin MR1, or the value calculated by subtracting the second excess amount E2 from the second monitor margin MR2 is smaller than zero (corresponding to YES at S404, at S408, or at S412), the ECU 55 determines that the abnormality that requires the fail-safe procedure to be performed occurs and sets the abnormality flag. The abnormality flag is used at S115 in FIG. 9 to determine the abnormality.

Next, concrete examples of the abnormality determining process are described with reference to FIGS. 12A and 12B and FIGS. 13A and 13B. The same is true for corresponding drawings in embodiments described later.

Figure 12A:
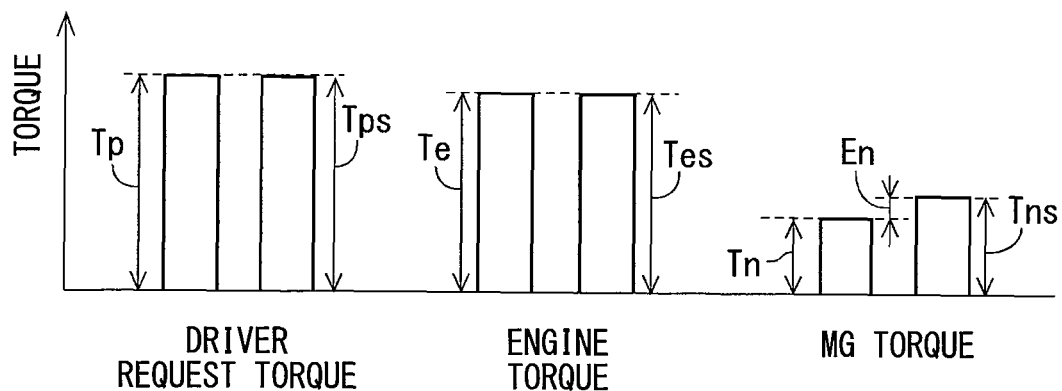
FIGS. 12A and 12B are diagrams for explaining the abnormality determining process according to the second embodiment.
Figure 12B:
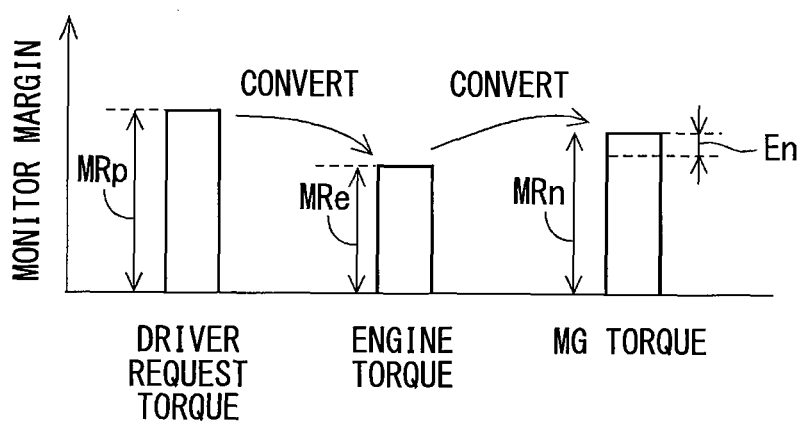

FIGS. 12A and 12B show a normal case where it is determined that the abnormality does not occur. In this example, as shown in FIG. 12A, regarding the driver request torque and the engine torque, the command value is equal to the monitor value. Therefore, both the driver request torque excess amount Ep and the engine torque excess amount Ee are zero.

Regarding the MG torque, the MG torque monitor value Tns is greater than the MG torque command value Tn by the MG torque excess amount En.

As shown in FIG. 12B, the driver request torque monitor margin MRp is sequentially converted to the engine torque monitor margin MRe and the MG torque monitor margin MRn. In this case, since the value calculated by subtracting the MG torque excess amount En from the MG torque monitor margin MRn is not smaller than zero (corresponding to NO at S412 in FIG. 11), it is determined at S413 in FIG. 11 that the abnormality does not occur, and the fail-safe procedure is not performed.

Figure 13A:
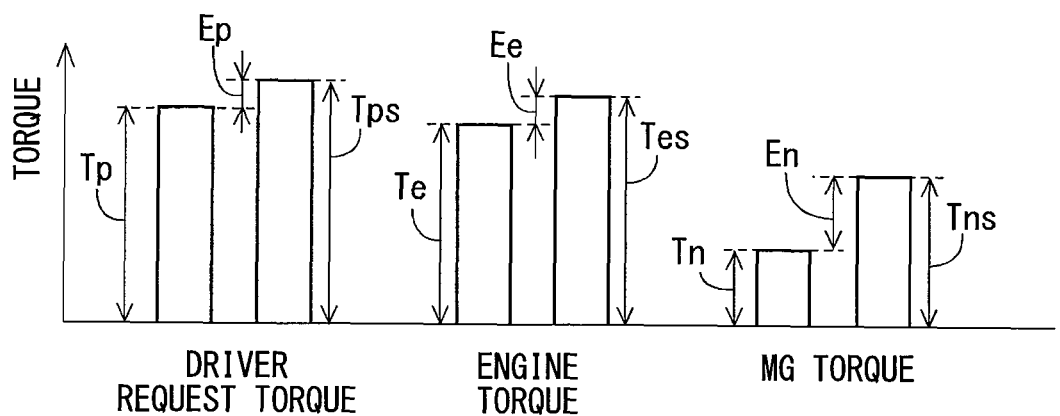
FIGS. 13A and 13B are diagrams for explaining the abnormality determining process according to the second embodiment.
Figure 13B:
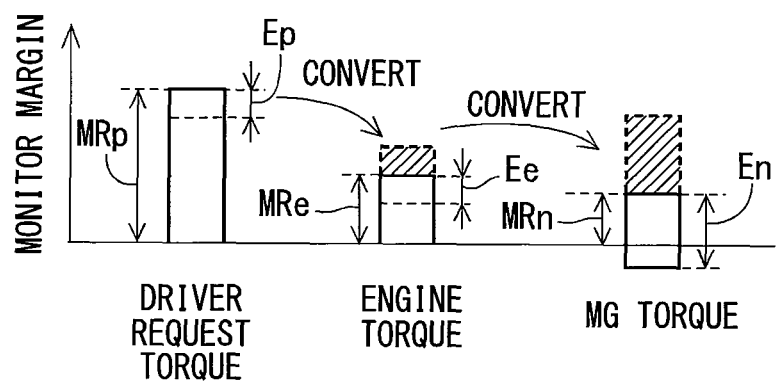

FIGS. 13A and 13B show an abnormal case where it is determined that the abnormality occurs. In FIG. 13B, a portion hatched with diagonal lines indicates the amount of reduction in the monitor margin due to the excess amount which is the absolute value of the difference between the command value and the monitor value.

In this example, as shown in FIG. 13A, the driver request torque monitor value Tps is greater than the driver request torque command value Tp by the driver request torque excess amount Ep, the engine torque monitor value Tes is greater than the engine torque command value Te by the engine torque excess amount Ee, and the MG torque monitor value Tns is greater than the MG torque command value Tn by the MG torque excess amount En.

As shown in FIG. 13B, the driver request torque monitor margin MRp is sequentially converted to the engine torque monitor margin MRe and the MG torque monitor margin MRn. At this time, the monitor margin decreases by the amount corresponding to the driver request torque excess amount Ep and the engine torque excess amount Ee, and the value calculated by subtracting the MG torque excess amount En from the MG torque monitor margin MRn becomes smaller than zero (corresponding to YES at S412 in FIG. 11). Therefore, it is determined at S414 in FIG. 11 that the abnormality occurs. Accordingly, the fail-safe procedure is performed at S117 in FIG. 3.

In the example shown in FIG. 13B, it is determined that the abnormality occurs due to the fact that the value calculated by subtracting the MG torque excess amount En from the MG torque monitor margin MRn is smaller than zero. However, if the value calculated by subtracting the driver request torque excess amount Ep from the driver request torque monitor margin MRp or the value calculated by subtracting the engine torque excess amount Ee from the engine torque monitor margin MRe becomes smaller than zero before the subtraction of the MG torque excess amount En from the MG torque monitor margin MRn is performed, it is determined at that time that the abnormality occurs.

As described above, according to the second embodiment, the ECU 55 controls the vehicle 90 equipped with multiple driving sources including the engine 10 and one rotating electrical machine 25. Even in such a configuration, the same advantages as the first embodiment can be obtained.

Correspondence between terms used in the second embodiment and claims is as follows. The ECU 55 corresponds to a driver request torque command value calculating device, a driving-source command value calculating device, a monitor value calculating device, a driver request torque monitor margin setting device, a driving-source monitor margin calculating device, and an abnormality determining device.

Figure 9:
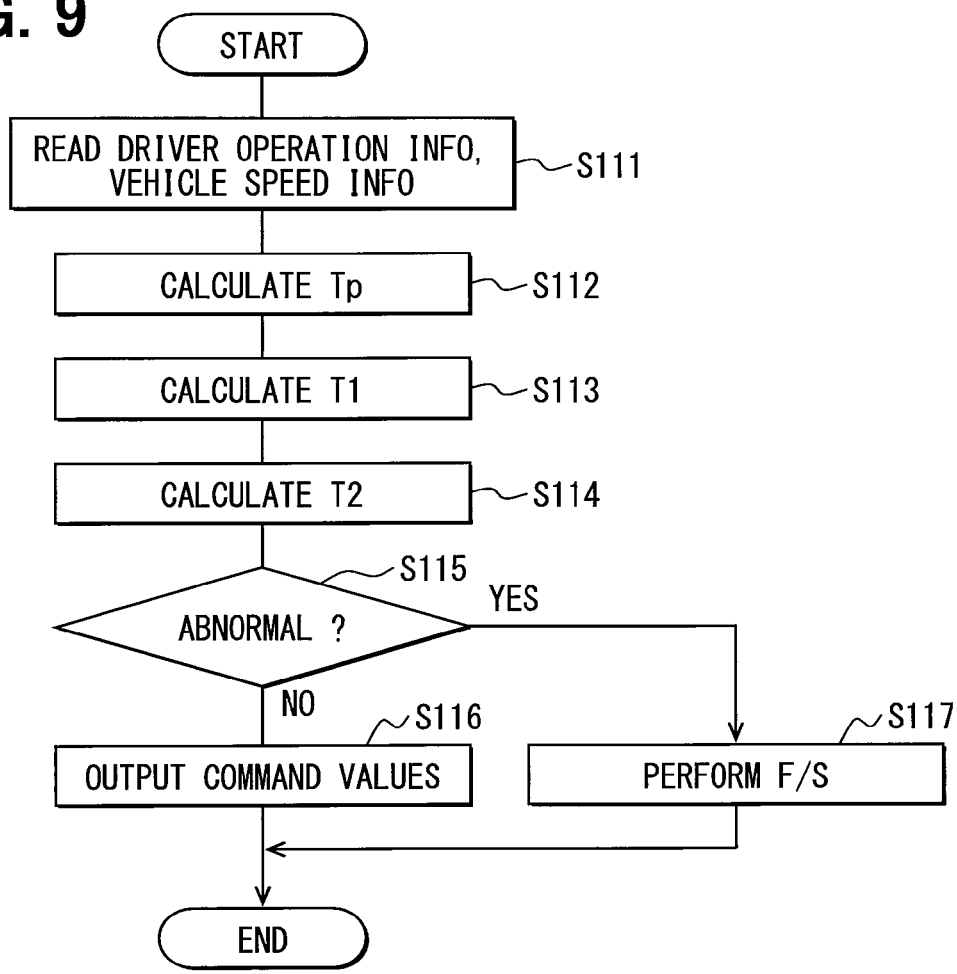
FIG. 9 is a flowchart for explaining a command value calculating process according to the second embodiment.

S112 in FIG. 9 corresponds to a function of the driver request torque command value calculating device. S113 and S114 in FIG. 9 correspond to a function of the driving-source command value calculating device. S212, S213, and S214 in FIG. 10 correspond to a function of the monitor value calculating device. S401 in FIG. 11 corresponds to a function of the driver request torque monitor margin setting device. S405 and S409 in FIG. 11 correspond to a function of the driving-source monitor margin calculating device. S414 in FIG. 11 corresponds to a function of the abnormality determining device.

The engine 10 and the rotating electrical machine 25 correspond to driving sources. The engine torque command value Te and the MG torque command value Tn correspond to driving-source command values. Specifically, the engine torque command value Te corresponds to a first command value and the MG torque command value Tn corresponds to a second command value.

The engine torque monitor value Tes and the MG torque monitor value Tn correspond to driving-source monitor values. Specifically, the engine torque monitor value Tes corresponds to a first monitor value and the MG torque monitor value Tns corresponds to a second monitor value.

The engine torque excess amount Ee and the MG torque excess amount En correspond to driving-source excess amounts. Specifically, the engine torque excess amount Ee corresponds to a first excess amount and the MG torque excess amount En corresponds to a second excess amount.

The engine torque monitor margin MRe and the MG torque monitor margin MRn correspond to driving-source monitor margins. Specifically, the engine torque monitor margin MRe corresponds to a first monitor margin and the MG torque monitor margin MRn corresponds to a second monitor margin.

Third Embodiment

A third embodiment of the present disclosure is described below with reference to FIGS. 14-16B. The third embodiment is similar in configuration to the first embodiment, but different in the abnormality determining process.

As can be seen from the formula (2), according to the third embodiment, the MG2 torque command value Tm is calculated by subtracting the engine torque command value Te and the MG1 torque command value Tg, which are converted to a MG2 torque equivalent, from the driver request torque command value Tp. Therefore, for example, in cases where the engine torque command value Te increases largely, the MG2 torque command value Tm decreases with the increase in the engine torque command value Te.

Therefore, according to the third embodiment, the monitoring of the engine torque command value Te is omitted so that the monitoring point can be reduced.

An abnormality determining process according to the third embodiment is described below with reference to a flowchart shown in FIG. 14.

Procedures performed at S321, S322, S323, S324, and S325 are the same as the procedures performed at S301, S302, S303, S304, and S305 in FIG. 5, respectively.

At S326, the ECU 50 calculates a second monitor margin MR2 by converting a value, which is calculated by subtracting the first excess amount E1 from the first monitor margin MR1, to a value corresponding to torque of a second driving source. According to the third embodiment, since the second driving source is the first rotating electrical machine 21, the second monitor margin MR2 is the MG1 torque monitor margin MRg.

The MG1 torque monitor margin MRg is calculated by the following formula (7):

$$MRg = \{\rho/(1+\rho)\} \times MRe \quad (7)$$

Procedures performed at S327, S328, and S329 are the same as the procedures performed at S310, S311, and S312 in FIG. 5, respectively.

At S330, the ECU 50 calculates a third monitor margin MR3. The third monitor margin MR3 is converted to a value corresponding to torque of the third driving source by using the second monitor margin MR2.

According to the third embodiment, since the third driving source is the second rotating electrical machine 22, the third monitor margin MR3 is the MG2 torque monitor margin MRm. The MG2 torque monitor margin MRm is calculated by the following formula (8):

$$MRm = MRp - Ep - \{-1/\rho\} \times Eg \quad (8)$$

Procedures performed at S331, S332, S333, S334, and S335 are the same as the procedures performed at S314, S315, S316, S317, and S318 in FIG. 5, respectively.

Figure 15A:
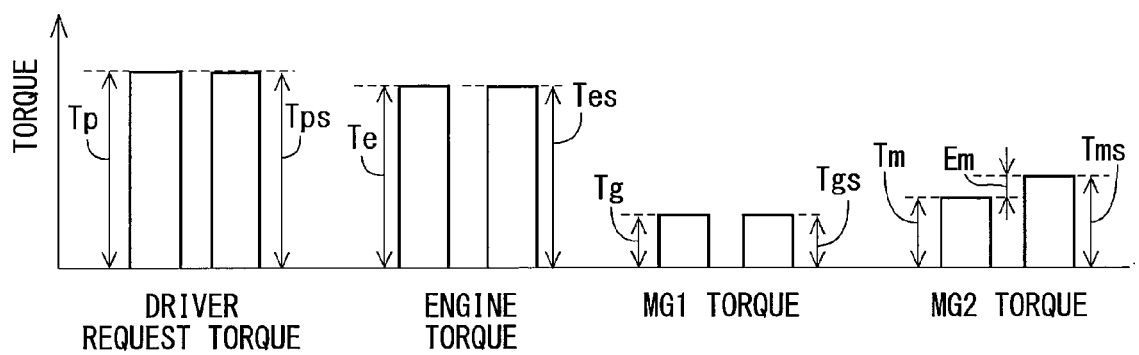
FIGS. 15A and 15B are diagrams for explaining the abnormality determining process according to the third embodiment.
Figure 15B:
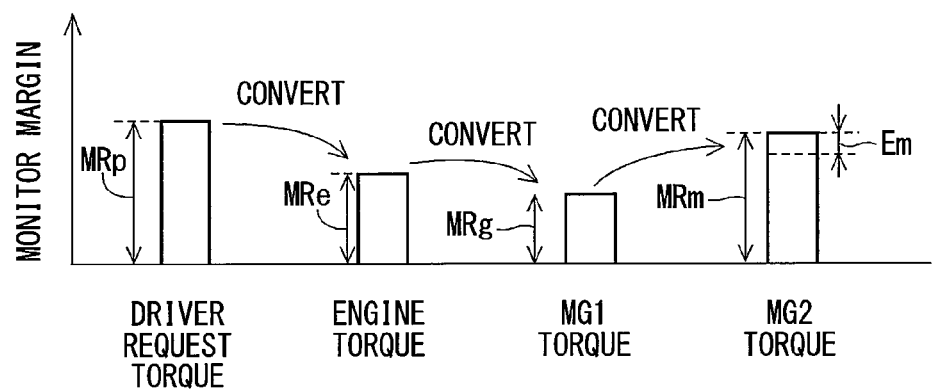
Figure 16A:
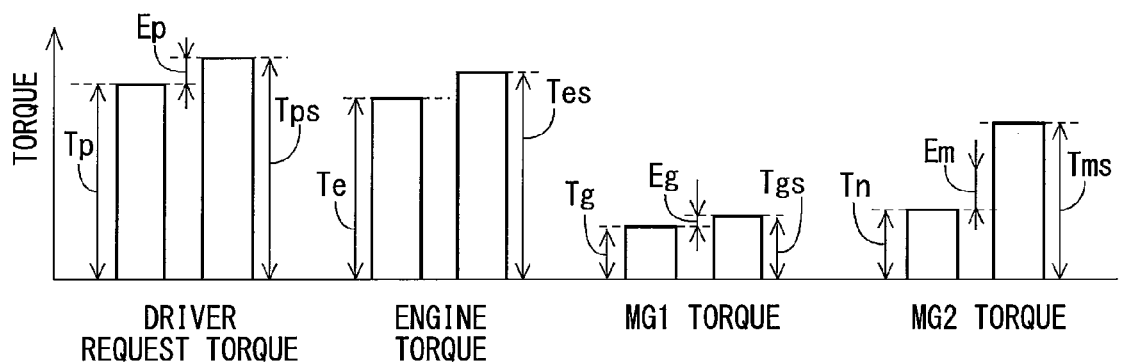
FIGS. 16A and 16B are diagrams for explaining the abnormality determining process according to the third embodiment.
Figure 16B:
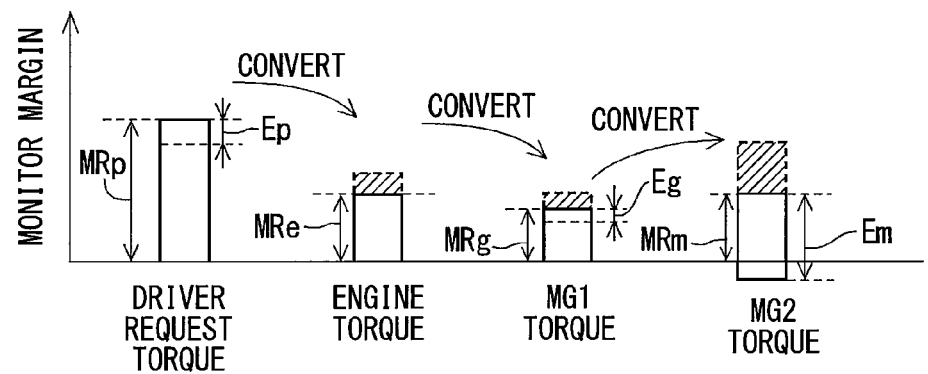

Next, concrete examples of the abnormality determining process are described with reference to FIGS. 15A and 15B and FIGS. 16A and 16B. FIGS. 15A and 16A show a comparison between the command value and the monitor value. FIGS. 15B and 16B show the monitor margin.

FIGS. 15A and 15B show a normal case where it is determined that the abnormality does not occur. In this example, as shown in FIG. 15A, regarding the driver request torque, the engine torque, and the MG1 torque, the command value is equal to the monitor value. Therefore, both the engine torque excess amount Ee and the MG1 torque excess amount Eg are zero.

Regarding the MG2 torque, the MG2 torque monitor value Tms is greater than the MG2 torque command value Tm by the MG2 torque excess amount Em.

As shown in FIG. 15B, the driver request torque monitor margin MRp is sequentially converted to the engine torque monitor margin MRe, the MG1 torque monitor margin MRg, and the MG2 torque monitor margin MRm. In this case, since the value calculated by subtracting the MG2 torque excess amount Em from the MG2 torque monitor margin MRm is not smaller than zero (corresponding to NO at S333 in FIG. 14), it is determined at S334 in FIG. 14 that the abnormality does not occur, and the fail-safe procedure is not performed.

FIGS. 16A and 16B show an abnormal case where it is determined that the abnormality occurs. In FIG. 16B, a portion hatched with diagonal lines indicates the amount of reduction in the monitor margin due to the excess amount which is the absolute value of the difference between the command value and the monitor value. In this example, as shown in FIG. 16A, the driver request torque monitor value Tps is greater than the driver request torque command value Tp by the driver request torque excess amount Ep, the MG1 torque monitor value Tgs is greater than the MG1 torque command value Tg by the MG1 torque excess amount Eg, and the MG2 torque monitor value Tms is greater than the MG2 torque command value Tm by the MG2 torque excess amount Em. According to the third embodiment, since the monitoring of the engine torque command value Te is omitted, the engine torque excess amount Ee is not calculated.

As shown in FIG. 16B, the driver request torque monitor margin MRp is sequentially converted to the engine torque monitor margin MRe, the MG1 torque monitor margin MRg, and the MG2 torque monitor margin MRm. At this time, the monitor margin decreases by the amount corresponding to the driver request torque excess amount Ep and the MG1 torque excess amount Eg, and the value calculated by subtracting the MG2 torque excess amount Em from the MG2 torque monitor margin MRm becomes smaller than zero (corresponding to YES at S333 in FIG. 14). Therefore, it is determined at S335 in FIG. 14 that the abnormality occurs. Accordingly, the fail-safe procedure is performed at S108 in FIG. 3.

According to the third embodiment, the engine 10, the first rotating electrical machine 21, and the second rotating electrical machine 22 are connected to one another through the dividing mechanism 40. Therefore, the rotation speed has a correlation with the torque, for example, in such a manner that when the rotation speed Ne of the engine 10 increases, the rotation speed Nm of the second rotating electrical machine 22 decreases. Further, as can be seen from the formula (2), according to the third embodiment, the MG2 torque command value Tm is calculated by subtracting the engine torque command value Te and the MG1 torque command value Tg, which are converted to a MG2 torque equivalent, from the driver request torque command value Tp. Therefore, for example, in cases where the engine torque command value Te increases largely, the MG2 torque command value Tm decreases with the increase in the engine torque command value Te.

For the above reason, according to the third embodiment, the monitoring of the engine torque command value Te is omitted, and the engine torque excess amount Ee is not calculated. Accordingly, although the MG1 torque monitor margin MRg and the MG2 torque monitor margin MRm are not greater than the driver request torque monitor margin MRp, the MG1 torque monitor margin MRg and the MG2 torque monitor margin MRm become greater than those in the first embodiment by the amount corresponding to the engine torque excess amount Ee. In such an approach, a function of the driver request torque monitor margin MRp can be maximized within the driver request torque monitor margin MRp. Thus, it is possible to prevent the fail-safe procedure from being performed unnecessarily.

Further, the same advantages as the preceding embodiments can be obtained.

Correspondence between terms used in the third embodiment and claims is as follows.

Figure 14:
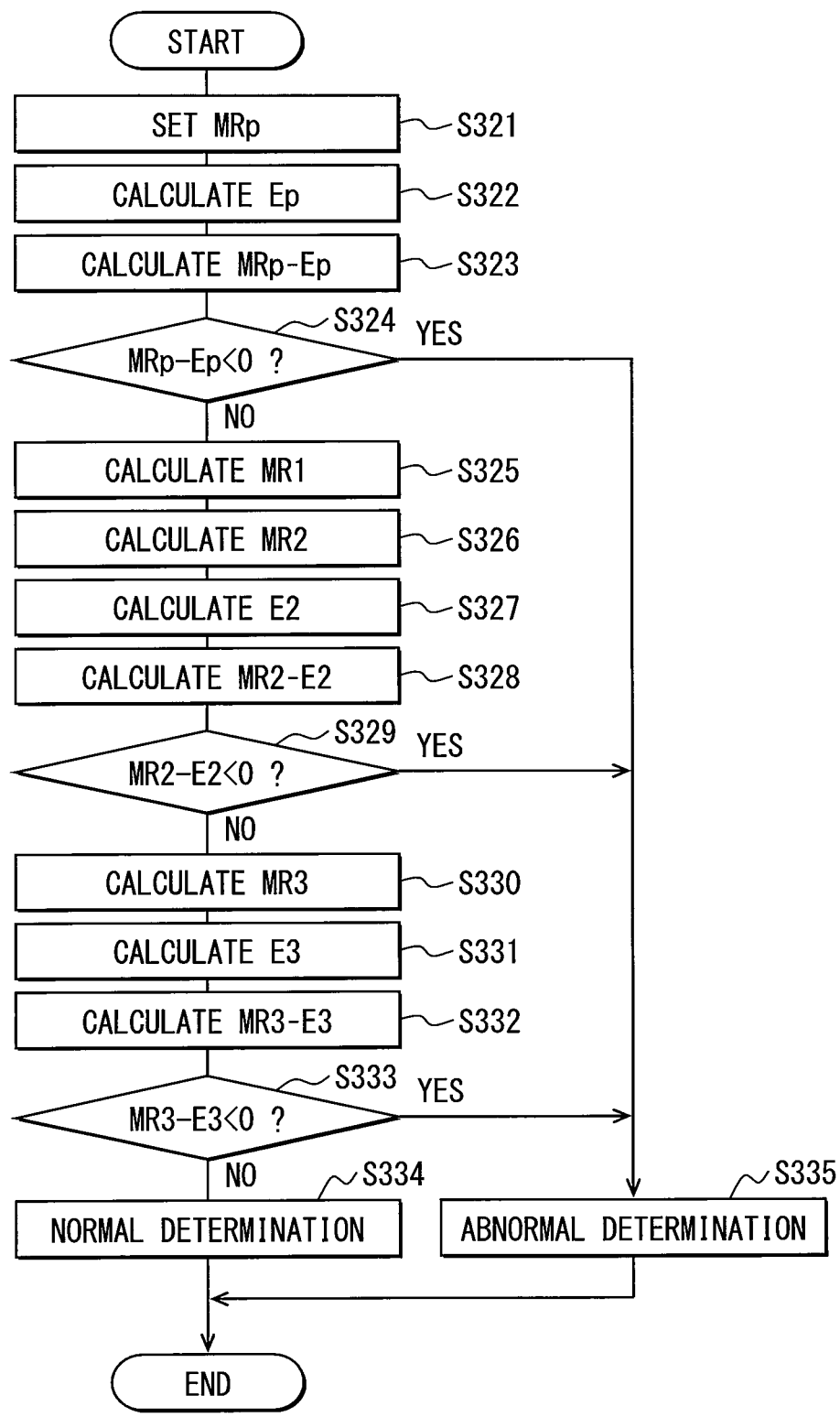
FIG. 14 is a flowchart for explaining an abnormality determining process according to a third embodiment of the present disclosure.

S321 in FIG. 14 corresponds to a function of the driver request torque monitor margin setting device. S325, S326, and S330 in FIG. 14 correspond to a function of the driving-source monitor margin calculating device. S335 in FIG. 14 corresponds to a function of the abnormality determining device.

Fourth Embodiment

A fourth embodiment of the present disclosure is described below with reference to FIGS. 17-19B. The fourth embodiment is similar in configuration to the second embodiment, but different in the abnormality determining process.

As can be seen from the formula (5), according to the fourth embodiment, the MG torque command value Tn is calculated by subtracting the engine torque command value Te, which is converted to a MG torque equivalent, from the driver request torque command value Tp. Therefore, for example, in cases where the engine torque command value Te increases largely, the MG torque command value Tn decreases with the increase in the engine torque command value Te.

Therefore, according to the fourth embodiment, the monitoring of the engine torque command value Te is omitted so that the monitoring point can be reduced.

An abnormality determining process according to the fourth embodiment is described below with reference to a flowchart shown in FIG. 17.

Figure 11:
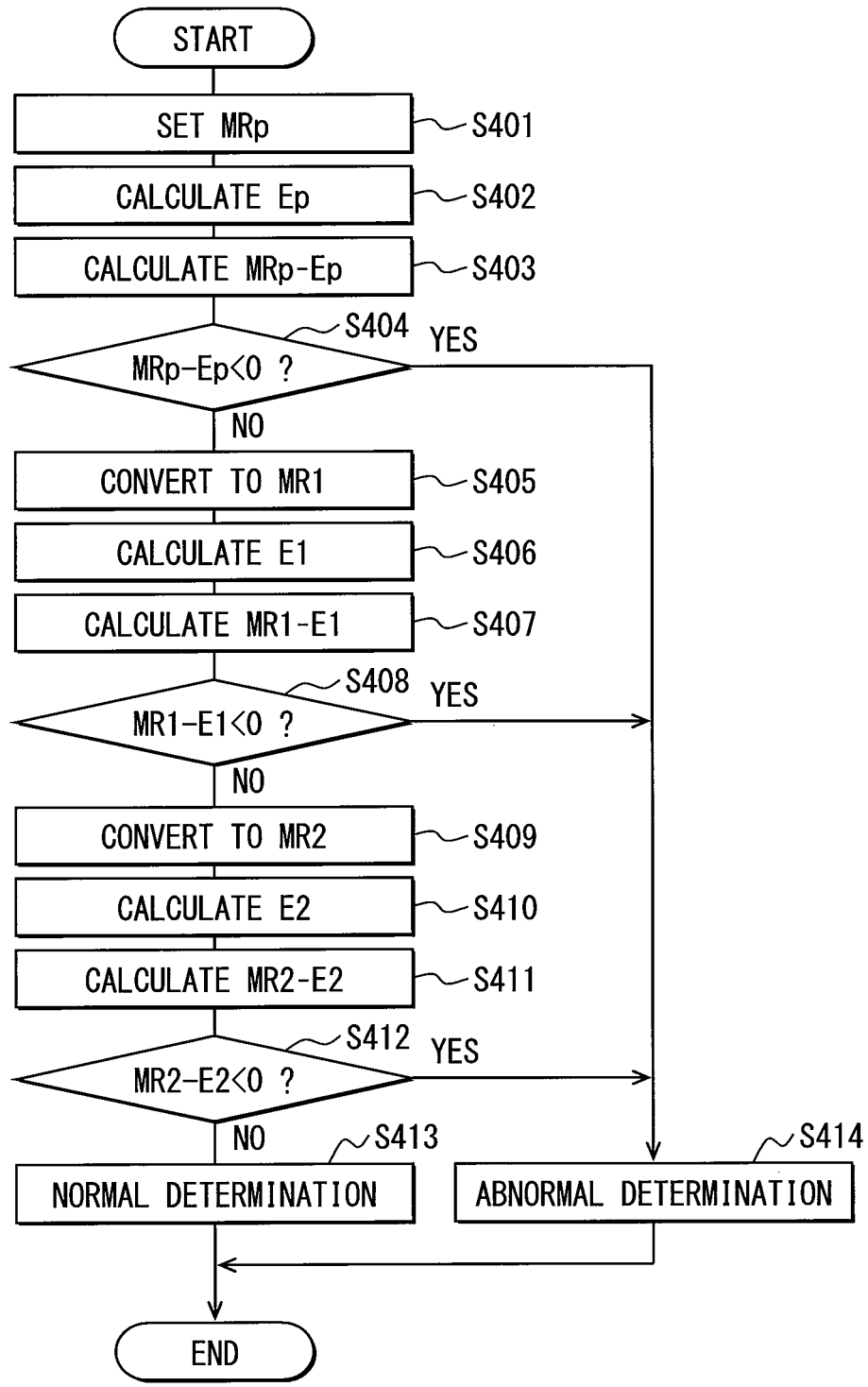
FIG. 11 is a flowchart for explaining an abnormality determining process according to the second embodiment.

Procedures performed at S421, S422, S423, S424, and S425 are the same as the procedures performed at S401, S402, S403, S404, and S405 in FIG. 11, respectively.

At S426, the ECU 55 calculates a second monitor margin MR2. The second monitor margin MR2 is converted to a value corresponding to torque of the second driving source by using the first monitor margin MR1.

According to the fourth embodiment, since the second driving source is the rotating electrical machine 25, the second monitor margin MR2 is the MG torque monitor margin MRn. The MG torque monitor margin MRn is calculated by the following formula (9):

$$MRn = MRp - Ep \qquad (9)$$

Procedures performed at S427, S428, S429, S430, and S431 are the same as the procedures performed at S410, S411, S412, S413, and S414 in FIG. 11, respectively.

Figure 18A:
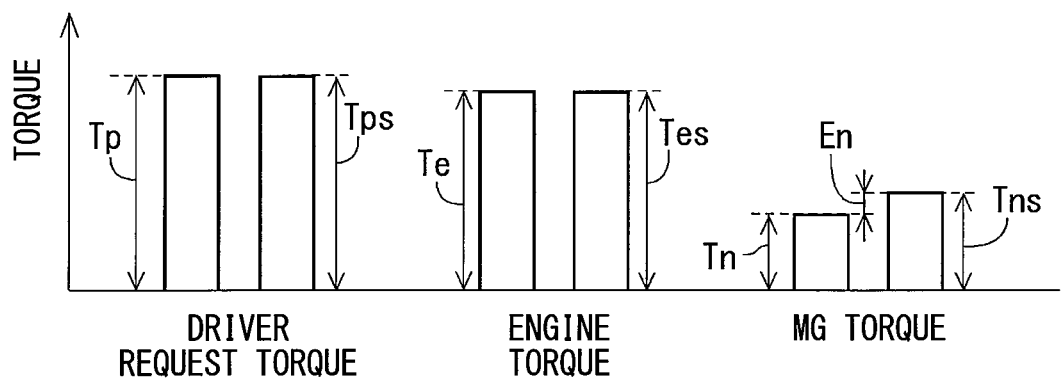
FIGS. 18A and 18B are diagrams for explaining the abnormality determining process according to the fourth embodiment.
Figure 18B:
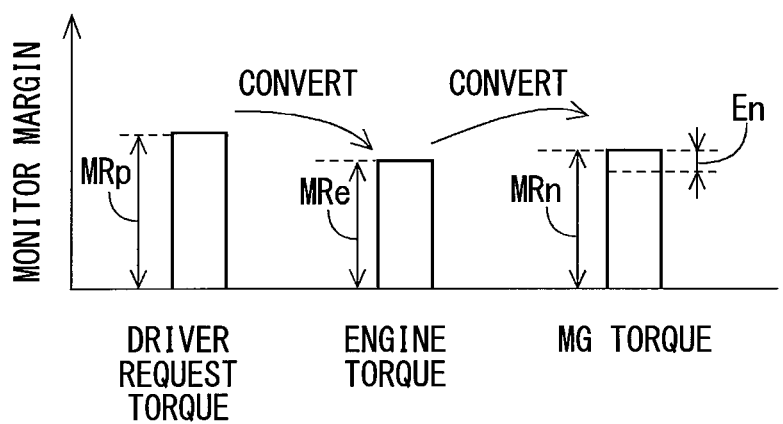
Figure 19A:
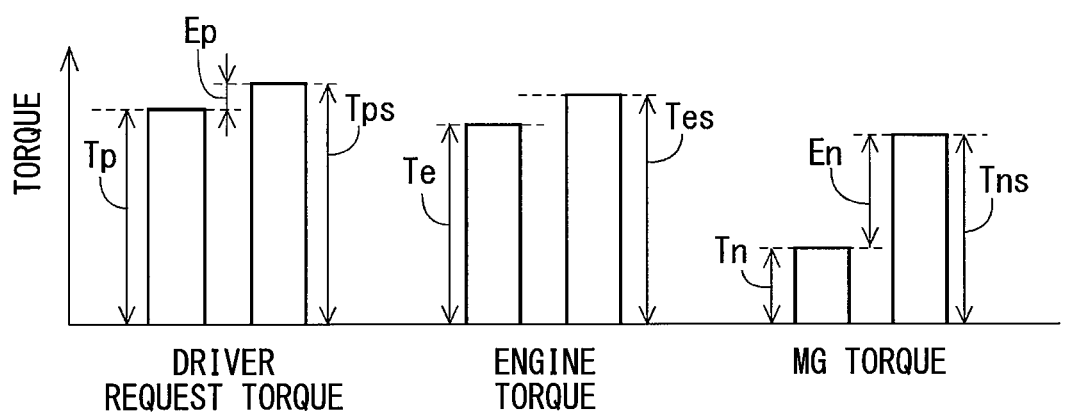
FIGS. 19A and 19B are diagrams for explaining the abnormality determining process according to the fourth embodiment.
Figure 19B:
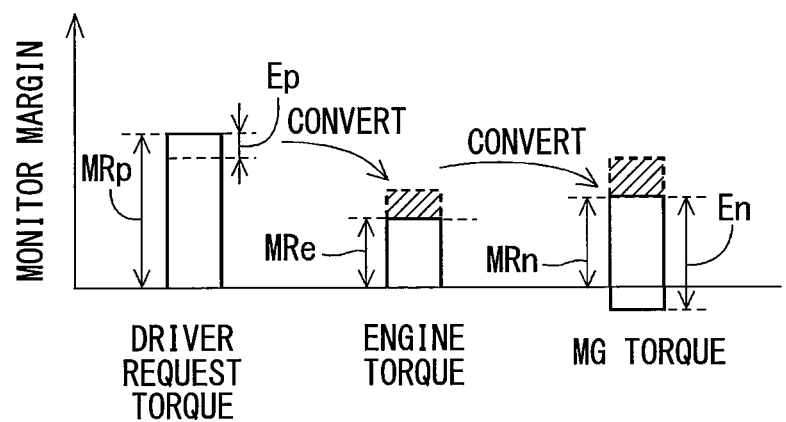

Next, concrete examples of the abnormality determining process are described with reference to FIGS. 18A and 18B and FIGS. 19A and 19B. FIGS. 18A and 19A show a comparison between the command value and the monitor value. FIGS. 18B and 19B show the monitor margin.

FIGS. 18A and 18B show a normal case where it is determined that the abnormality does not occur. In this example, as shown in FIG. 18A, regarding the driver request torque and the engine torque, the command value is equal to the monitor value. Therefore, both the driver request torque excess amount Ep and the engine torque excess amount Ee are zero. Regarding the MG torque, the MG torque monitor value Tns is greater than the MG torque command value Tn by the MG torque excess amount En.

As shown in FIG. 18B, the driver request torque monitor margin MRp is sequentially converted to the engine torque monitor margin MRe and the MG torque monitor margin MRn. In this case, since the value calculated by subtracting the MG torque excess amount En from the MG torque monitor margin MRn is not smaller than zero (corresponding to NO at S429 in FIG. 17), it is determined at S430 in FIG. 17 that the abnormality does not occur, and the fail-safe procedure is not performed.

FIGS. 19A and 19B show an abnormal case where it is determined that the abnormality occurs. In FIG. 19B, a portion hatched with diagonal lines indicates the amount of reduction in the monitor margin due to the excess amount which is the absolute value of the difference between the command value and the monitor value. In this example, as shown in FIG. 19A, the driver request torque monitor value Tps is greater than the driver request torque command value Tp by the driver request torque excess amount Ep, and the MG torque monitor value Tns is greater than the MG torque command value Tn by the MG torque excess amount En. According to the fourth embodiment, since the monitoring of the engine torque command value Te is omitted, the engine torque excess amount Ee is not calculated.

As shown in FIG. 19B, the driver request torque monitor margin MRp is sequentially converted to the engine torque monitor margin MRe and the MG torque monitor margin MRn. At this time, the MG torque monitor margin MRn decreases by the amount corresponding to the driver request torque excess amount Ep, and the value calculated by subtracting the MG torque excess amount En from the MG torque monitor margin MRn becomes smaller than zero (corresponding to YES at S429 in FIG. 17). Therefore, it is determined at S431 in FIG. 17 that the abnormality occurs. Accordingly, the fail-safe procedure is performed at S108 in FIG. 3.

According to the fourth embodiment, the engine 10 and the rotating electrical machine 25 are connected to each other through the gear and the like. Therefore, the rotation speed has a correlation with the torque, for example, in such a manner that when the rotation speed Ne of the engine 10 increases, the rotation speed of the rotating electrical machine 25 decreases. Further, as can be seen from the formula (5), according to the fourth embodiment, the MG torque command value Tn is calculated by subtracting the engine torque command value Te, which is converted to a MG torque equivalent, from the driver request torque command value Tp. Therefore, for example, in cases where the engine torque command value Te increases largely, the MG torque command value Tn decreases with the increase in the engine torque command value Te.

For the above reason, according to the fourth embodiment, the monitoring of the engine torque command value Te is omitted, and the engine torque excess amount Ee is not calculated. Although the MG torque monitor margin MRn is not greater than the driver request torque monitor margin MRp, the MG torque monitor margin MRn becomes greater than that in the second embodiment by the amount corresponding to the engine torque excess amount Ee. In such an approach, the function of the driver request torque monitor margin MRp can be maximized within the driver request torque monitor margin MRp. Thus, it is possible to prevent the fail-safe procedure from being performed unnecessarily.

Further, the same advantages as the preceding embodiments can be obtained.

Correspondence between terms used in the fourth embodiment and claims is as follows.

Figure 17:
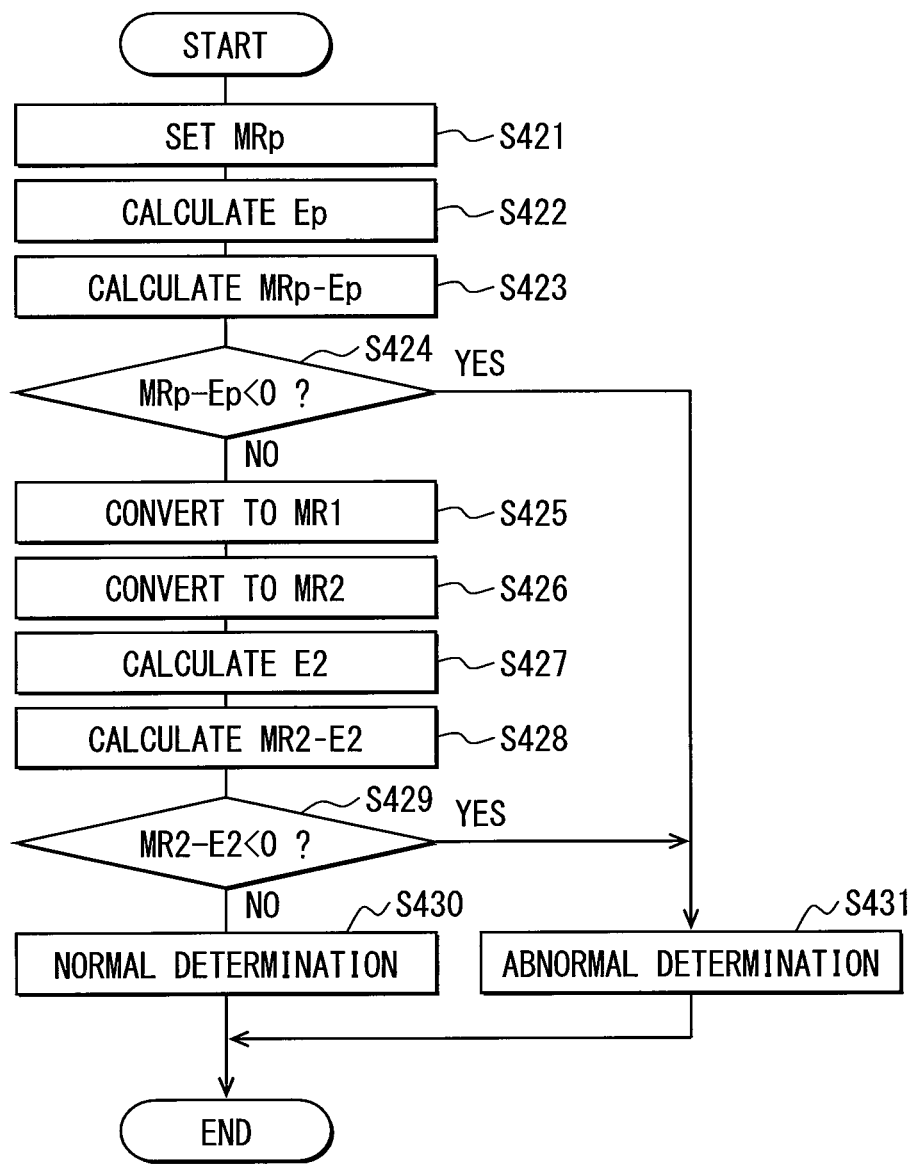
FIG. 17 is a flowchart for explaining an abnormality determining process according to a fourth embodiment of the present disclosure.

S421 in FIG. 17 corresponds to a function of the driver request torque monitor margin setting device. S425 and S426 in FIG. 17 correspond to a function of the driving-source monitor margin calculating device. S431 in FIG. 17 corresponds to a function of the abnormality determining device.

Next, fifth to eighth embodiments of the present disclosure are described. According to the first to fourth embodiments described above, the driver request torque monitor margin MRp is sequentially converted to the driving-source monitor margins. In contrast, according to the fifth to the eighth embodiments, the driver request torque monitor margin MRp is divided among the driving sources, and the abnormality is determined based on the divided monitor margin and the excess amount.

Fifth Embodiment

The fifth embodiment of the present disclosure is described below with reference to FIGS. 20-22B. The fifth embodiment is similar in configuration to the first embodiment, but different in the abnormality determining process. According to the fifth embodiment, the driver request torque monitor margin MRp is divided among the engine torque monitor margin MRe, the MG1 torque monitor margin MRg, and the MG2 torque monitor margin MRm. Specifically, a divisional driver request torque monitor margin MRpd, which is calculated by subtracting the driver request torque excess amount Ep from the driver request torque monitor margin MRp, is divided among the engine torque monitor margin MRe, the MG1 torque monitor margin MRg, and the MG2 torque monitor margin MRm.

An abnormality determining process according to the fifth embodiment is described below with reference to a flowchart shown in FIG. 20.

Procedures performed at S501, S502, S503, and S504 are the same as the procedures performed at S301, S302, S303, and S304 in FIG. 5, respectively.

At S505, the ECU 50 calculates a first monitor margin MR1. According to the first embodiment, since the first driving source is the engine 10, the first monitor margin MR1 is the engine torque monitor margin MRe.

The engine torque monitor margin MRe is calculated by the following formula (10):

$$MRe = (MRp - Ep) \times De \times Ke = MRpd \times De \times Ke \quad (10)$$

In the formula (10), De represents a divisional coefficient used to divide the divisional driver request torque monitor margin MRp to the engine torque, and Ke represents a conversion coefficient used to convert the divided driver request torque monitor margin MRp to an engine torque equivalent. The conversion coefficient Ke depends on the gear ratio.

Procedures performed at S506, S507, and S508 are the same as the procedures performed at S306, S307, and S308 in FIG. 5, respectively.

At S509, the ECU 50 calculates a second monitor margin MR2. According to the fifth embodiment, since the second driving source is the first rotating electrical machine 21, the second monitor margin MR2 is the MG1 torque monitor margin MRg.

The MG1 torque monitor margin MRg is calculated by the following formula (11):

$$MRg = (MRp - Ep) \times Dg \times Kg = MRpd \times Dg \times Kg \quad (11)$$

In the formula (11), Dg represents a divisional coefficient used to divide the divisional driver request torque monitor margin MRpn to the MG1 torque, and Kg represents a conversion coefficient used to convert the divided driver request torque monitor margin MRp to a MG1 torque equivalent. The conversion coefficient Kg depends on the gear ratio.

Procedures performed at S510, S511, and S512 are the same as the procedures performed at S310, S311, and S312 in FIG. 5, respectively.

At S513, the ECU 50 calculates a third monitor margin MR3. According to the fifth embodiment, since the third driving source is the second rotating electrical machine 22, the third monitor margin MR3 is the MG2 torque monitor margin MRm.

The MG2 torque monitor margin MRm is calculated by the following formula (12):

$$MRm = (MRp - Ep) \times (1 - De - Dg) \times Km \quad (12)$$
$$= MRpd \times Dm1 \times Km$$

In the formula (12), Dm1 represents a divisional coefficient used to divide the divisional driver request torque monitor margin MRpd to the MG2 torque, and Km represents a conversion coefficient used to convert the divided driver request torque monitor margin MRp to a MG2 torque equivalent. The conversion coefficient Km depends on the gear ratio.

The divisional coefficients De, Dg, and Dm1 can be set to any values. Preferably, the divisional coefficients De, Dg, and Dm1 should be set according to a usage ratio of torque of each driving source to the driver request torque. The divisional coefficients De, Dg, and Dm1 can vary according to the driver request torque, for example.

Procedures performed at S514, S515, S516, S517, and S518 are the same as the procedures performed at S314, S315, S316, S317, and S318 in FIG. 5, respectively.

Figure 21A:
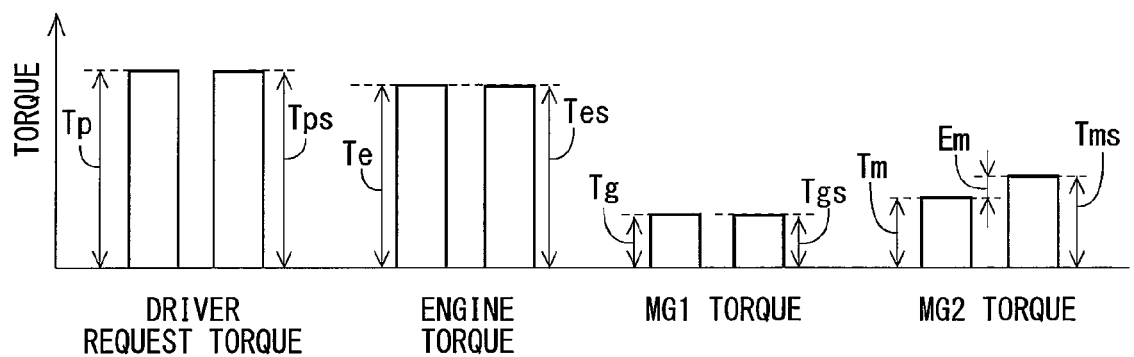
FIGS. 21A and 21B are diagrams for explaining the abnormality determining process according to the fifth embodiment.
Figure 21B:
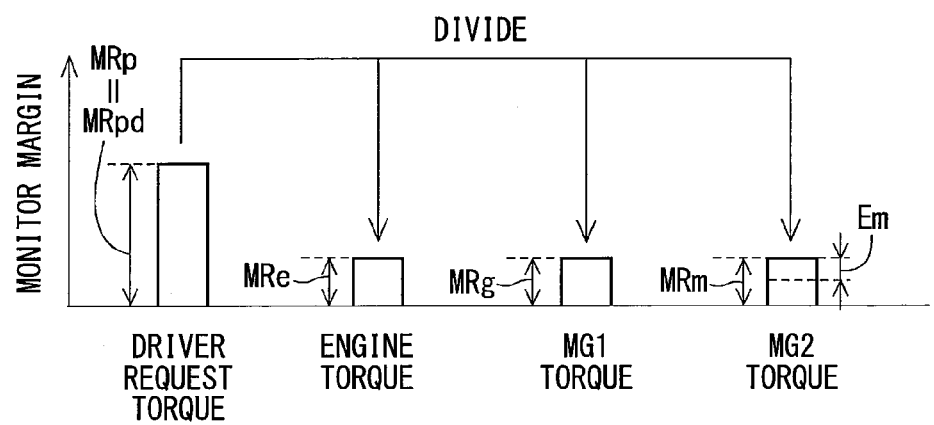
Figure 22A:
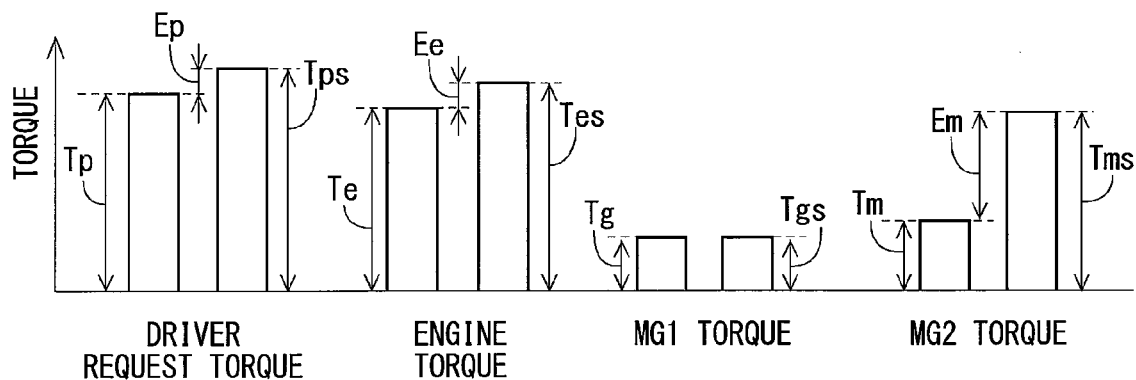
FIGS. 22A and 22B are diagrams for explaining the abnormality determining process according to the fifth embodiment.
Figure 22B:
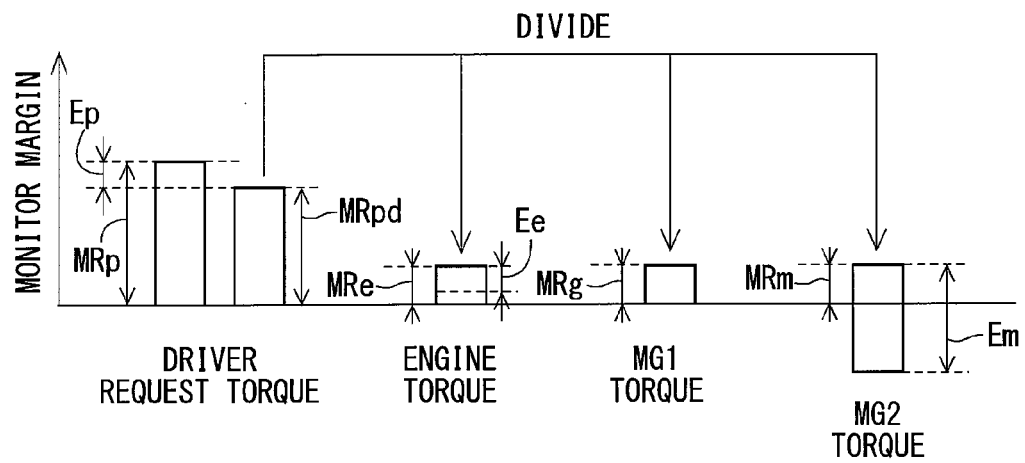

Next, concrete examples of the abnormality determining process are described with reference to FIGS. 21A and 21B and FIGS. 22A and 22B. FIGS. 21A and 22A show a comparison between the command value and the monitor value. FIGS. 21B and 22B show the monitor margin. These examples are based on the assumption that the divisional driver request torque monitor margin MRpd are divided equally among the driving sources, i.e., De=Dg=Dm=⅓. Further, for the sake of simplicity of explanation, each conversion coefficient is set to one, i.e., Ke=Kg=Km=1.

FIGS. 21A and 21B show a normal case where it is determined that the abnormality does not occur. In this example, as shown in FIG. 21A, regarding the driver request torque, the engine torque, and the MG1 torque, the command value is almost equal to the monitor value. Here, it is assumed that the driver request torque excess amount Ep is zero, so that the divisional driver request torque monitor margin MRpd is equal to the driver request torque monitor margin MRp. Regarding the MG2 torque, the MG2 torque monitor value Tms is greater than the MG2 torque command value Tm by the MG2 torque excess amount Em.

As shown in FIG. 21B, the divisional driver request torque monitor margin MRpd is divided among the engine torque monitor margin MRe, the MG1 torque monitor margin MRg, and the MG2 torque monitor margin MRm. In this case, since a value calculated by subtracting each excess amount from the divided monitor margin of the corresponding driving source is not smaller than zero (corresponding to NO at S505, S512, and S516 in FIG. 20), it is determined at S517 in FIG. 20 that the abnormality does not occur, and the fail-safe procedure is not performed.

FIGS. 22A and 22B show an abnormal case where it is determined that the abnormality occurs. In this example, the driver request torque excess amount Ep, the engine torque excess amount Ee, the MG1 torque excess amount Eg, and the MG2 torque excess amount Em are those shown in FIG. 22A.

As shown in FIG. 22B, the divisional driver request torque monitor margin MRpd is divided among the engine torque monitor margin MRe, the MG1 torque monitor margin MRg, and the MG2 torque monitor margin MRm. In this case, a value calculated by subtracting the engine torque excess amount Ee from the engine torque monitor margin MRe is not smaller than zero (corresponding to NO at S508 in FIG. 20), and a value calculated by subtracting the MG1 torque excess amount Eg from the MG1 torque monitor margin MRg is not smaller than zero (corresponding to NO at S512 in FIG. 20). However, a value calculated by subtracting the MG2 torque excess amount Em from the MG2 torque monitor margin MRm is smaller than zero (corresponding to YES at S516 in FIG. 20). Therefore, it is determined at S518 in FIG. 20 that the abnormality occurs, and the fail-safe procedure is performed at S108 in FIG. 3.

In the example shown in FIG. 22B, it is determined that the abnormality occurs due to the fact that the value calculated by subtracting the MG2 torque excess amount Em from the MG2 torque monitor margin MRm is smaller than zero. However, when at least one of the value calculated by subtracting the engine torque excess amount Ee from the engine torque monitor margin MRe, the value calculated by subtracting the MG1 torque excess amount Eg from the MG1 torque monitor margin MRg, and the value calculated by subtracting the MG2 torque excess amount Em from the MG2 torque monitor margin MRm becomes smaller than zero, it is determined that the abnormality occurs, and the fail-safe procedure is performed.

As described above, according to the fifth embodiment, the ECU 50 calculates the driving-source monitor margins by dividing the value, which is calculated by subtracting the driver request torque excess amount Ep from the driver request torque monitor margin MRp, at a predetermined divisional ratio.

Specifically, the value calculated by subtracting the driver request torque excess amount Ep from the driver request torque monitor margin MRp is divided at the predetermined ratio, and at least two of the engine torque monitor margin MRe, the MG1 torque monitor margin MRg, and the MG2 torque monitor margin MRm are calculated.

According to the fifth embodiment, the driver request torque monitor margin MRp are divided among the driving sources. Therefore, the abnormality can be determined more rapidly compared to when the driver request torque monitor margin MRp is sequentially converted. Further, it is possible to determine which of the driving-source command values has the abnormality. In addition, the same advantages as the preceding embodiments can be obtained.

Correspondence between terms used in the fifth embodiment and claims is as follows.

Figure 20:
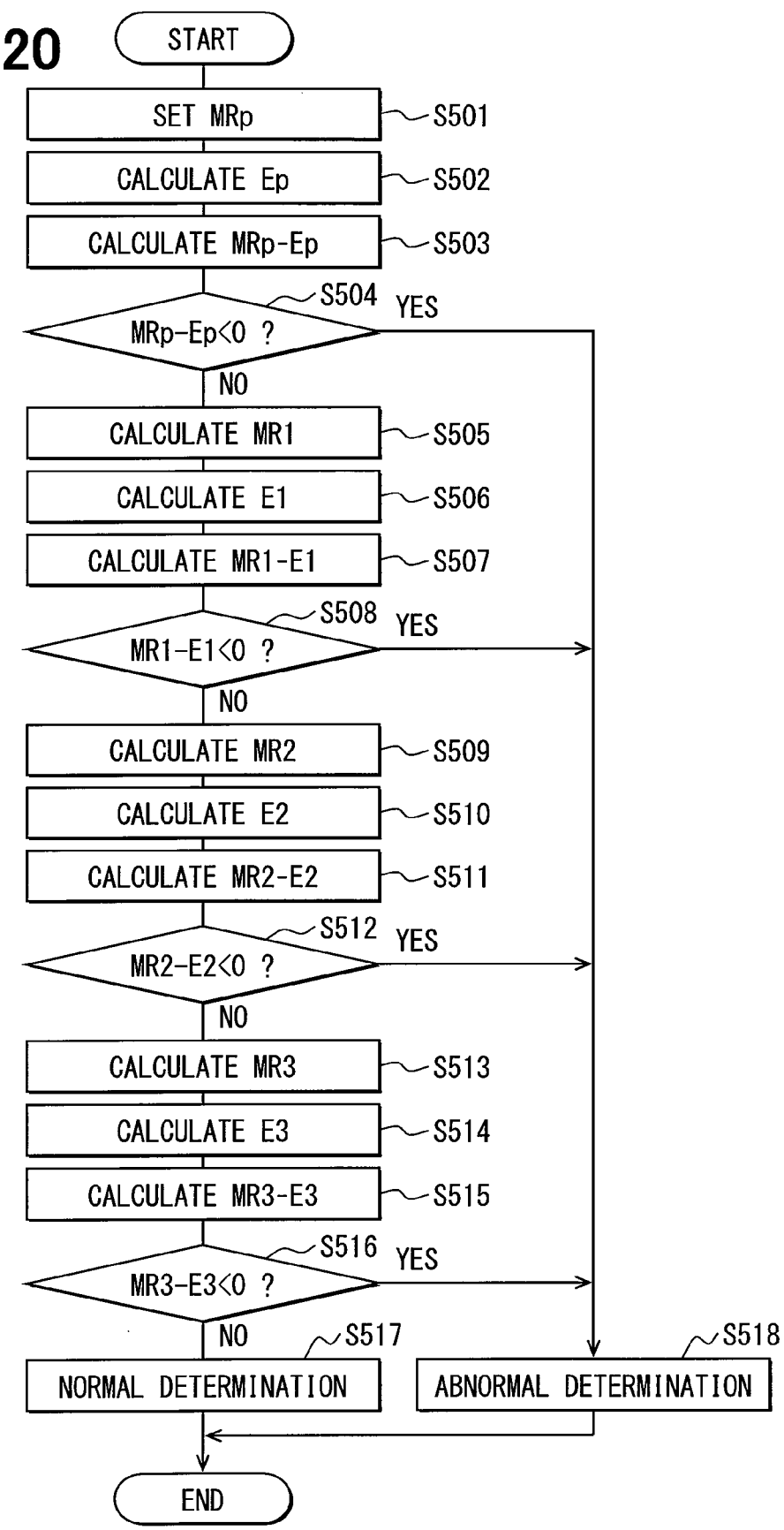
FIG. 20 is a flowchart for explaining an abnormality determining process according to a fifth embodiment of the present disclosure.

S501 in FIG. 20 corresponds to a function of the driver request torque monitor margin setting device. S505, S509, and S513 in FIG. 20 correspond to a function of the driving-source monitor margin calculating device. S518 in FIG. 20 corresponds to a function of the abnormality determining device.

Sixth Embodiment

The sixth embodiment of the present disclosure is described below with reference to FIGS. 23-25B. The sixth embodiment is similar in configuration to the second embodiment, but different in the abnormality determining process. According to the sixth embodiment, the driver request torque monitor margin MRp is divided between the engine torque monitor margin MRe and the MG torque monitor margin MRn. Specifically, a divisional driver request torque monitor margin MRpd, which is calculated by subtracting the driver request torque excess amount Ep from the driver request torque monitor margin MRp, is divided between the engine torque monitor margin MRe and the MG torque monitor margin MRn.

An abnormality determining process according to the sixth embodiment is described below with reference to a flowchart shown in FIG. 23.

Procedures performed at S601, S602, S603, S604, S605, S606, S607, and S608 are same as the procedures performed at S501, S502, S503, S504, S505, S506, S507, and S508 in FIG. 20, respectively.

At S609, the ECU 55 calculates a second monitor margin MR2. According to the sixth embodiment, since the second driving source is the rotating electrical machine 25, the second monitor margin MR2 is the MG torque monitor margin MRn.

The MG torque monitor margin MRn is calculated by the following formula (13):

$$MRn = (MRp - Ep) \times (1 - De) \times Kn = MRpd \times Dn \times Kn \qquad (13)$$

In the formula (13), Dn represents a divisional coefficient used to divide the divisional driver request torque monitor margin MRpd to the MG torque, and Kn represents a conversion coefficient used to convert the divided driver request torque monitor margin MRp to a MG torque equivalent. The conversion coefficient Kn depends on the gear ratio.

The divisional coefficients De and Dn can be set to any values. Preferably, the divisional coefficients De and Dn should be set according to a usage ratio of torque of each driving source to the driver request torque. The divisional coefficients De and Dn can vary according to the driver request torque, for example.

Procedures performed at S610, S611, S612, S613, and S614 are the same as the procedures performed at S410, S411, S412, S413, and S414 in FIG. 11, respectively.

Figure 24A:
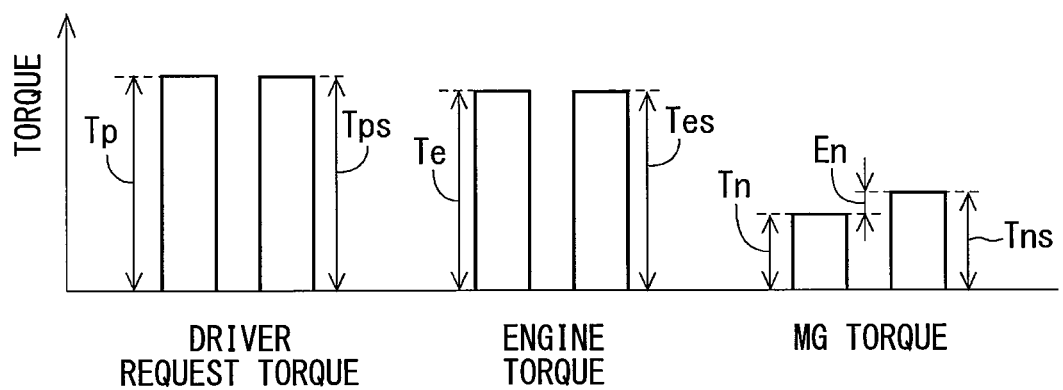
FIGS. 24A and 24B are diagrams for explaining the abnormality determining process according to the sixth embodiment.
Figure 24B:
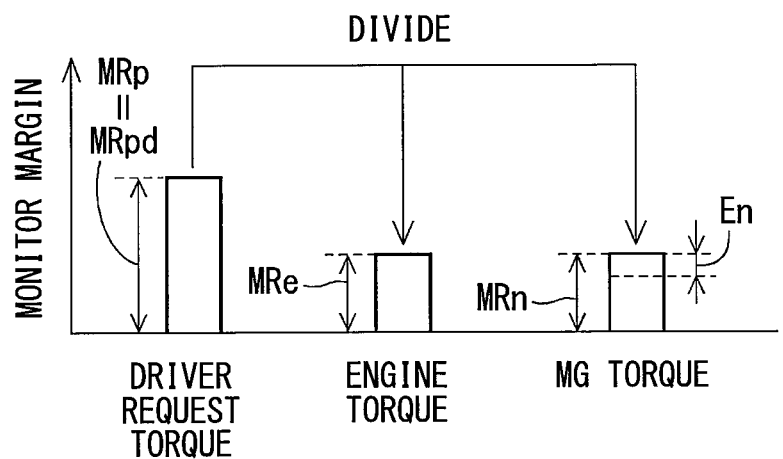
Figure 25A:
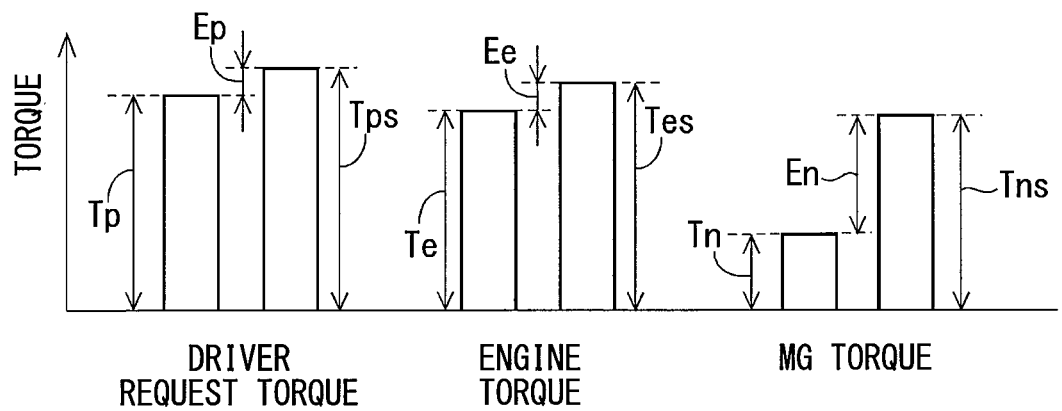
FIGS. 25A and 25B are diagrams for explaining the abnormality determining process according to the sixth embodiment.
Figure 25B:
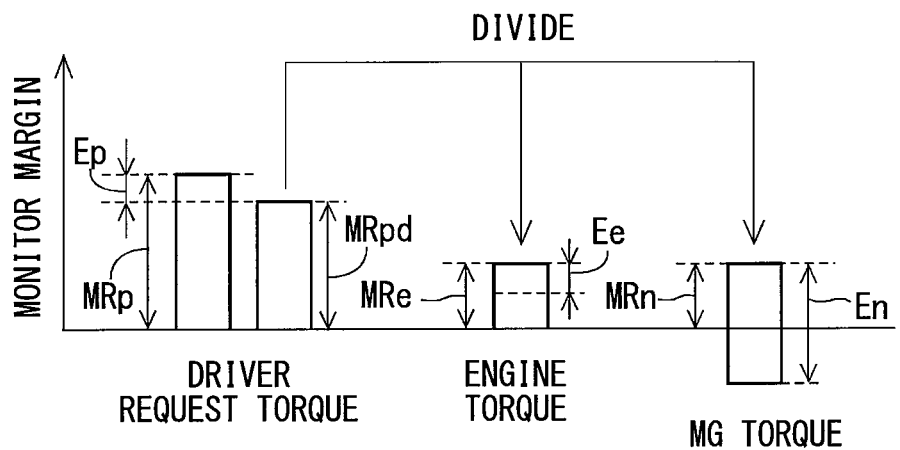

Next, concrete examples of the abnormality determining process are described with reference to FIGS. 24A and 24B and FIGS. 25A and 25B. FIGS. 24A and 25A show a comparison between the command value and the monitor value. FIGS. 24B and 25B show the monitor margin. These examples are based on the assumption that the divisional driver request torque monitor margin MRpd are divided equally between the driving sources, i.e., De=Dn=½. Further, for the sake of simplicity of explanation, each conversion coefficient is set to one, i.e., Ke=Kn=1.

FIGS. 24A and 24B show a normal case where it is determined that the abnormality does not occur. In this example, as shown in FIG. 24A, regarding the driver request torque and the engine torque, the command value is almost equal to the monitor value. Here, it is assumed that the driver request torque excess amount Ep is zero, so that the divisional driver request torque monitor margin MRpd is equal to the driver request torque monitor margin MRp. Regarding the MG torque, the MG torque monitor value Tns is greater than the MG torque command value Tn by the MG torque excess amount En.

As shown in FIG. 24B, the divisional driver request torque monitor margin MRpd is divided between the engine torque monitor margin MRe and the MG torque monitor margin MRn. In this case, since a value calculated by subtracting each excess amount from the divided monitor margin of the corresponding driving source is not smaller than zero (corresponding to NO at S608 and S612 in FIG. 23), it is determined at S613 in FIG. 23 that the abnormality does not occur, and the fail-safe procedure is not performed.

FIGS. 25A and 25B show an abnormal case where it is determined that the abnormality occurs. In this example, the driver request torque excess amount Ep, the engine torque excess amount Ee, and the MG torque excess amount En are those shown in FIG. 25A.

As shown in FIG. 25B, the divisional driver request torque monitor margin MRpd is divided between the engine torque monitor margin MRe and the MG torque monitor margin MRn. In this case, a value calculated by subtracting the engine torque excess amount Ee from the engine torque monitor margin MRe is not smaller than zero (corresponding to NO at S608 in FIG. 23). However, a value calculated by subtracting the MG torque excess amount En from the MG torque monitor margin MRn is smaller than zero (corresponding to YES at S612 in FIG. 23). Therefore, it is determined at S614 in FIG. 23 that the abnormality occurs, and the fail-safe procedure is performed at S117 in FIG. 9.

In the example shown in FIG. 25B, it is determined that the abnormality occurs due to the fact that the value calculated by subtracting the MG torque excess amount En from the MG torque monitor margin MRn is smaller than zero. However, when at least one of the value calculated by subtracting the engine torque excess amount Ee from the engine torque monitor margin MRe and the value calculated by subtracting the MG torque excess amount En from the MG torque monitor margin MRn becomes smaller than zero, it is determined that the abnormality occurs, and the fail-safe procedure is performed.

Even in such a configuration, the same advantages as the preceding embodiments can be obtained.

Correspondence between terms used in the sixth embodiment and claims is as follows.

Figure 23:
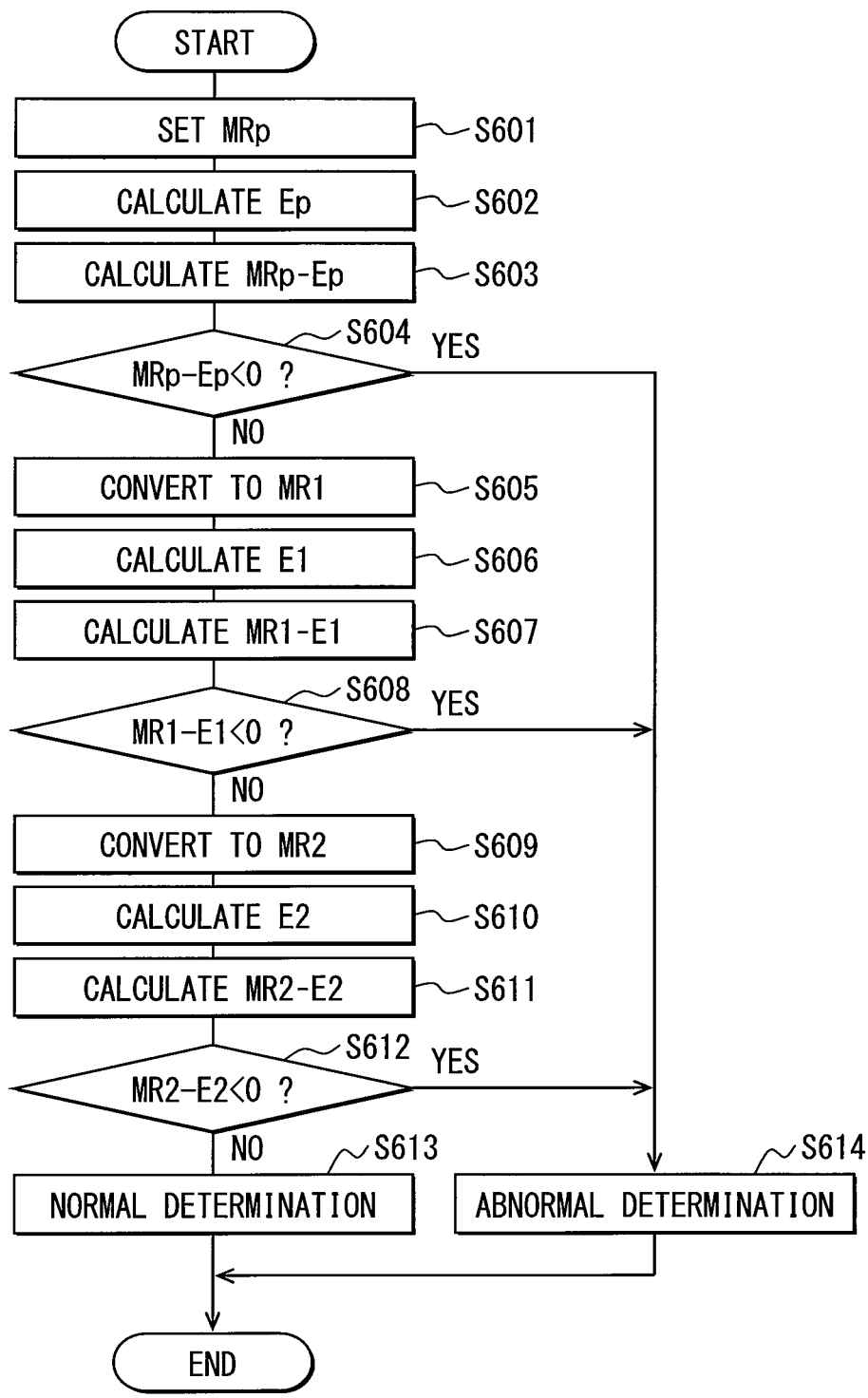
FIG. 23 is a flowchart for explaining an abnormality determining process according to a sixth embodiment of the present disclosure.

S601 in FIG. 23 corresponds to a function of the driver request torque monitor margin setting device. S605 and S609 in FIG. 23 correspond to a function of the driving-source monitor margin calculating device. S614 in FIG. 23 corresponds to a function of the abnormality determining device.

Seventh Embodiment

The seventh embodiment of the present disclosure is described below with reference to FIGS. 26-28B. The seventh embodiment is similar in configuration to the first embodiment, but different in the abnormality determining process. According to the seventh embodiment, like in the third embodiment, the monitoring of the engine torque command value Te is omitted so that the monitoring point can be reduced.

An abnormality determining process according to the seventh embodiment is described below with reference to a flowchart shown in FIG. 26.

Procedures performed at S521, S522, S523, and S524 are the same as the procedures performed at S501, S502, S503, and S504 in FIG. 20, respectively. Further, procedures performed at S525, S526, S527, and S528 are the same as the procedures performed at S509, S510, S511, and S512 in FIG. 20, respectively. That is, according to the seventh embodiment, procedures corresponding to S505, S506, S507, and S508 in FIG. 20 are omitted in order not to calculate the engine torque monitor margin MRe and the engine torque excess amount Ee.

At S529, the ECU 50 calculates a third monitor margin MR3. According to the seventh embodiment, since the third driving source is the second rotating electrical machine 22, the third monitor margin MR3 is the MG2 torque monitor margin MRm.

The MG2 torque monitor margin MRm is calculated by the following formula (14):

$$MRm = (MRp - Ep) \times (1 - Dg) \times Km \qquad (14)$$
$$= MRpd \times Dm2 \times Km$$

In the formula (14), Dm2 represents a divisional coefficient used to divide the divisional driver request torque monitor margin MRpd to the MG2 torque, and Km represents a conversion coefficient used to convert the divided driver request torque monitor margin MRp to a MG2 torque equivalent. The conversion coefficient Km depends on the gear ratio.

The divisional coefficients Dg and Dm2, which are used to calculate the MG1 torque monitor margin MRg and the MG2 torque monitor margin MRm, can be set to any values.

Procedures performed at S530, S531, S532, S533, and S534 are the same as the procedures performed at S514, S515, S516, S517, and S518 in FIG. 20, respectively.

Figure 27A:
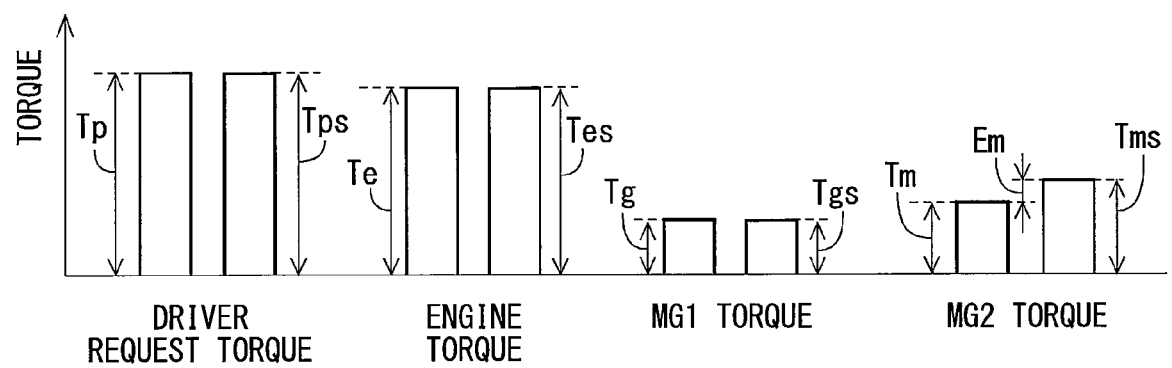
FIGS. 27A and 27B are diagrams for explaining the abnormality determining process according to the seventh embodiment.
Figure 27B:
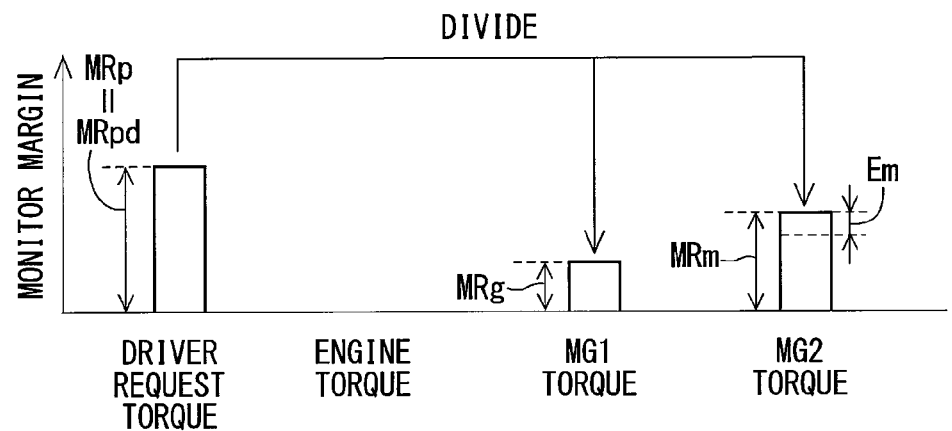
Figure 28A:
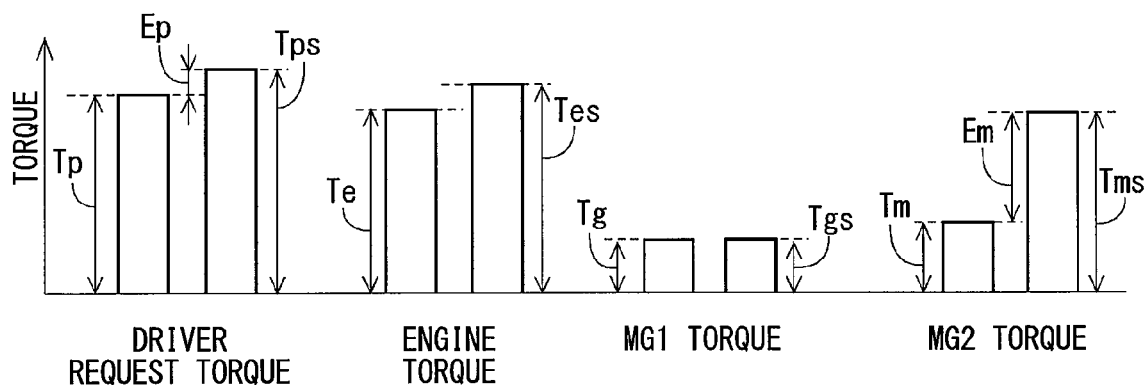
FIGS. 28A and 28B are diagrams for explaining the abnormality determining process according to the seventh embodiment.
Figure 28B:
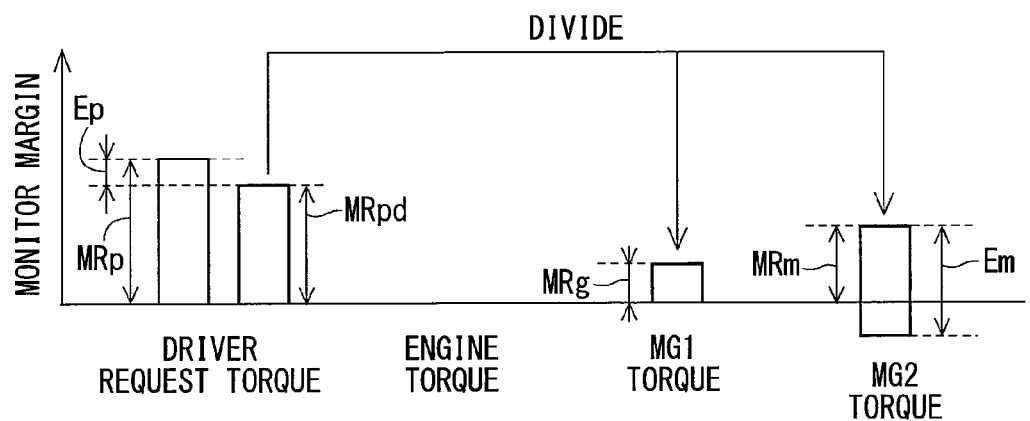

Next, concrete examples of the abnormality determining process are described with reference to FIGS. 27A and 27B and FIGS. 28A and 28B. FIGS. 27A and 28A show a comparison between the command value and the monitor value. FIGS. 27B and 28B show the monitor margin.

Firstly, division of the monitor margin is discussed.

The MG2 torque command value Tm is calculated by the formula (2) described above. As can be seen from the formula (2), the MG2 torque command value Tm is calculated so that the sum of the engine torque command value Te, the MG1 torque command value Tg, and the MG2 torque command value Tm can be equal to the driver request torque command value Tp. Therefore, when the engine torque command value Te increases, the MG2 torque command value Tm decreases accordingly.

For the above reason, according to the seventh embodiment, a value corresponding to the engine torque monitor margin MRe, which is calculated when the engine torque command value Te is monitored, is divided to the MG2 torque monitor margin MRm. That is, the divisional coefficient Dm2 of the seventh embodiment has a relationship indicated by the following formula (15) with the divisional coefficients Dm1 and De of the fifth embodiment.

$$Dm2 = Dm1 + De \qquad (15)$$

The examples shown in FIGS. 27A-28B are based on the assumption that the divisional coefficient Dg is ⅓ and the divisional coefficient Dm is ⅔. Further, for the sake of simplicity of explanation, each conversion coefficient is set to one, i.e., Kg=Km=1.

FIGS. 27A and 27B show a normal case where it is determined that the abnormality does not occur. In this example, as shown in FIG. 27A, regarding the driver request torque, the engine torque, and the MG1 torque, the command value is almost equal to the monitor value. Here, it is assumed that the driver request torque excess amount Ep is zero, so that the divisional driver request torque monitor margin MRpd is equal to the driver request torque monitor margin MRp. Regarding the MG2 torque, the MG2 torque monitor value Tms is greater than the MG2 torque command value Tm by the MG2 torque excess amount Em.

As shown in FIG. 27B, the divisional driver request torque monitor margin MRpd is divided between the MG1 torque monitor margin MRg and the MG2 torque monitor margin MRm. In this case, since a value calculated by subtracting each excess amount from the divided monitor margin of the corresponding driving source is not smaller than zero (corresponding to NO at S528 and S532 in FIG. 26), it is determined at S533 in FIG. 26 that the abnormality does not occur, and the fail-safe procedure is not performed.

FIGS. 28A and 28B show an abnormal case where it is determined that the abnormality occurs. In this example, the driver request torque excess amount Ep, the MG1 torque excess amount Eg, and the MG2 torque excess amount Em are those shown in FIG. 28A. It is noted that the engine torque excess amount Ee is not calculated.

As shown in FIG. 28B, the divisional driver request torque monitor margin MRpd is divided between the MG1 torque monitor margin MRg and the MG2 torque monitor margin MRm. In this case, a value calculated by subtracting the MG1 torque excess amount Eg from the MG1 torque monitor margin MRg is not smaller than zero (corresponding to NO at S524 in FIG. 26). However, a value calculated by subtracting the MG2 torque excess amount Em from the MG2 torque monitor margin MRm is smaller than zero (corresponding to YES at S532 in FIG. 26). Therefore, it is determined at S534 in FIG. 26 that the abnormality occurs, and the fail-safe procedure is performed at S108 in FIG. 3.

In the example shown in FIG. 28B, it is determined that the abnormality occurs due to the fact that the value calculated by subtracting the MG2 torque excess amount Em from the MG2 torque monitor margin MRm is smaller than zero. However, when at least one of the value calculated by subtracting the MG1 torque excess amount Eg from the MG1 torque monitor margin MRg and the value calculated by subtracting the MG2 torque excess amount Em from the MG2 torque monitor margin MRm becomes smaller than zero, it is determined that the abnormality occurs, and the fail-safe procedure is performed.

As described above, according to the seventh embodiment, like in the third embodiment, the monitoring of the engine torque command value Te is omitted in order not to calculate the engine torque monitor margin MRe and the engine torque excess amount Ee. Further, in consideration of the fact that the MG2 torque command value Tm is calculated by subtracting values corresponding to the engine torque command value Te and the MG1 torque command value Tg from the driver request torque command value Tp, the monitor margin, which is divided to the engine torque in the fifth embodiment, is divided to the MG2 torque monitor margin MRm. In such an approach, the function of the driver request torque monitor margin MRp can be maximized within the driver request torque monitor margin MRp. Thus, it is possible to prevent the fail-safe procedure from being performed unnecessarily.

In addition, the same advantages as the preceding embodiments can be obtained.

Correspondence between terms used in the seventh embodiment and claims is as follows.

Figure 26:
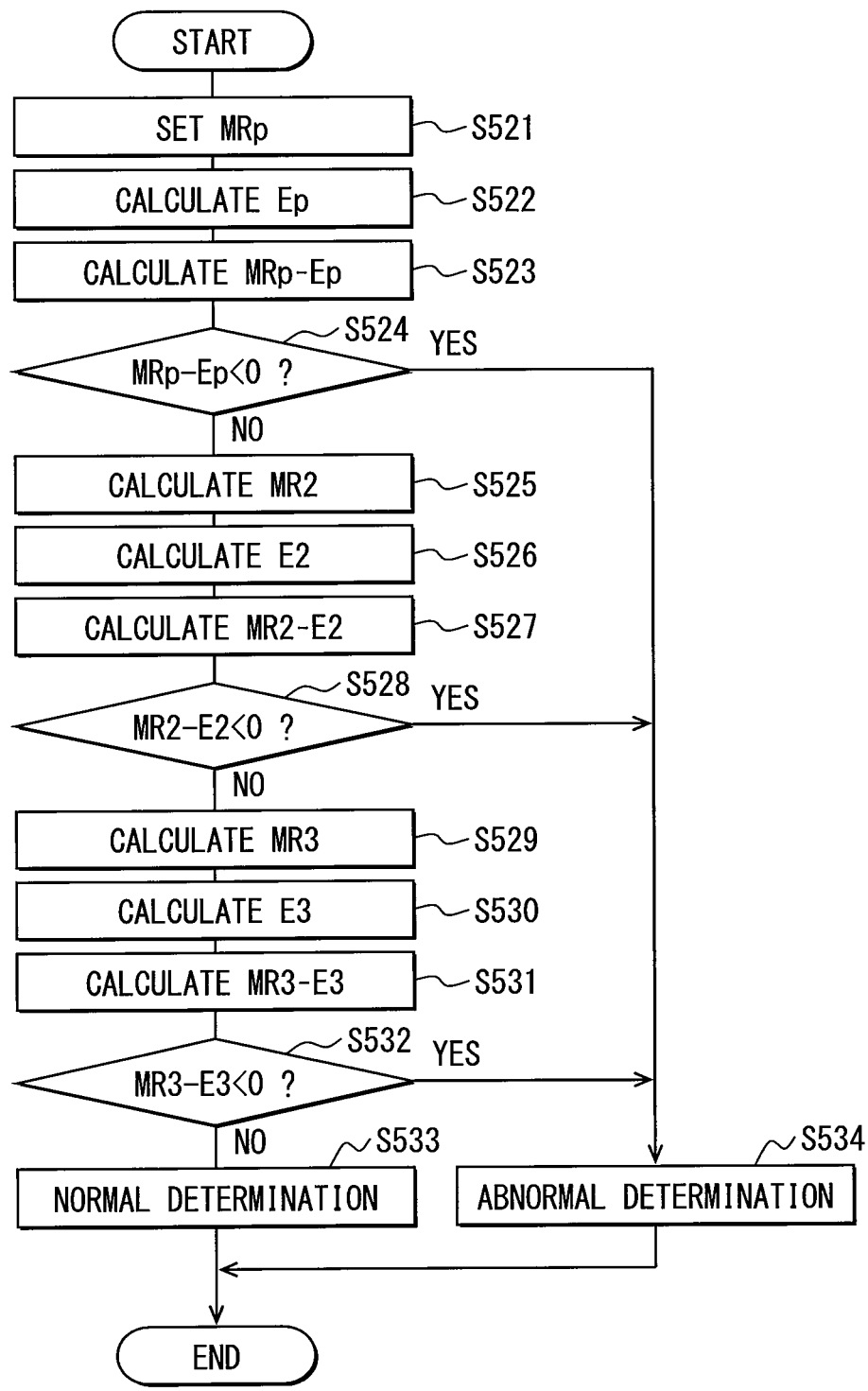
FIG. 26 is a flowchart for explaining an abnormality determining process according to a seventh embodiment of the present disclosure.

S521 in FIG. 26 corresponds to a function of the driver request torque monitor margin setting device. S525 and S529 in FIG. 26 correspond to a function of the driving-source monitor margin calculating device. S534 in FIG. 26 corresponds to a function of the abnormality determining device.

Eighth Embodiment

The eighth embodiment of the present disclosure is described below with reference to FIGS. 29-31B. The eighth embodiment is similar in configuration to the second embodiment, but different in the abnormality determining process. According to the eighth embodiment, like in the fourth embodiment, the monitoring of the engine torque command value Te is omitted so that the monitoring point can be reduced.

An abnormality determining process according to the eighth embodiment is described below with reference to a flowchart shown in FIG. 29.

Procedures performed at S621, S622, S623, and S624 are the same as the procedures performed at S601, S602, S603, and S604 in FIG. 23, respectively. According to the eighth embodiment, procedures corresponding to S505, S506, S507, and S508 in FIG. 23 are omitted in order not to calculate the engine torque monitor margin MRe and the engine torque excess amount Ee.

At S625, the ECU 50 calculates a second monitor margin MR2. According to the eighth embodiment, since the second driving source is the rotating electrical machine 25, the second monitor margin MR2 is the MG torque monitor margin MRn.

The MG torque monitor margin MRn is calculated by the following formula (16):

$$MRn = (MRp - Ep) \times Dn \times Kn = MRpd \times Dn \times Kn \quad (16)$$

In the formula (16), Dn represents a divisional coefficient used to divide the divisional driver request torque monitor margin MRpd to the MG torque, and Kn represents a conversion coefficient used to convert the divisional driver request torque monitor margin MRpd to a MG torque equivalent. According to the eighth embodiment, Dn=1. The conversion coefficient Kn depends on the gear ratio.

Procedures performed at S626, S627, S628, S629, and S630 are the same as the procedures performed at S610, S611, S612, S613, and S614 in FIG. 23, respectively.

Figure 30A:
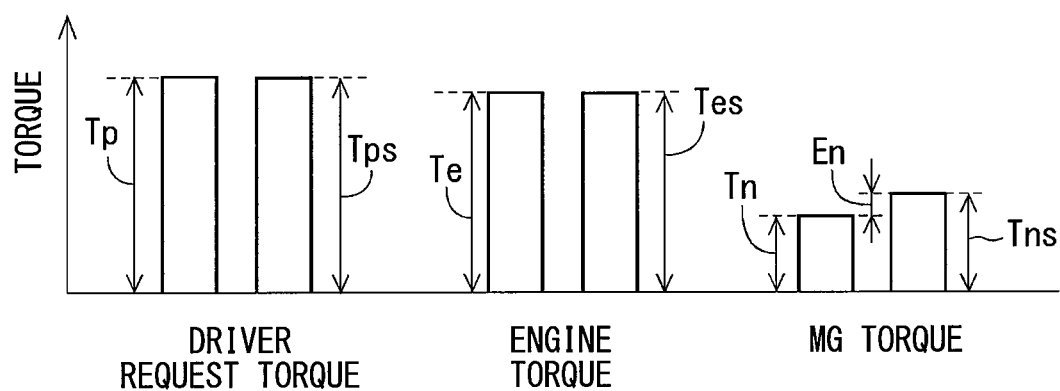
FIGS. 30A and 30B are diagrams for explaining the abnormality determining process according to the eighth embodiment.
Figure 30B:
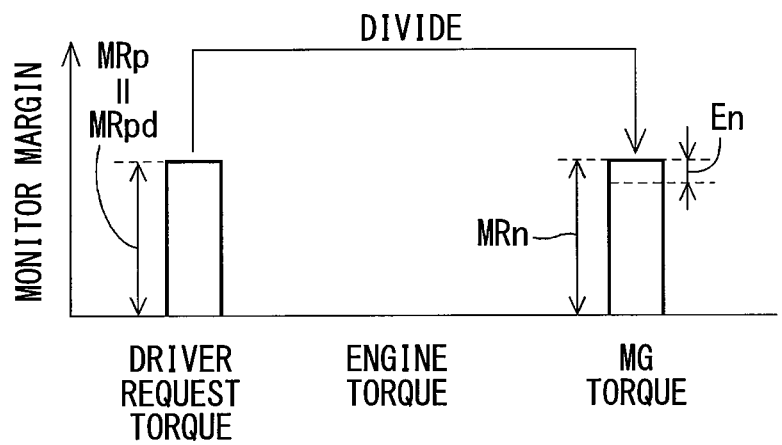
Figure 31A:
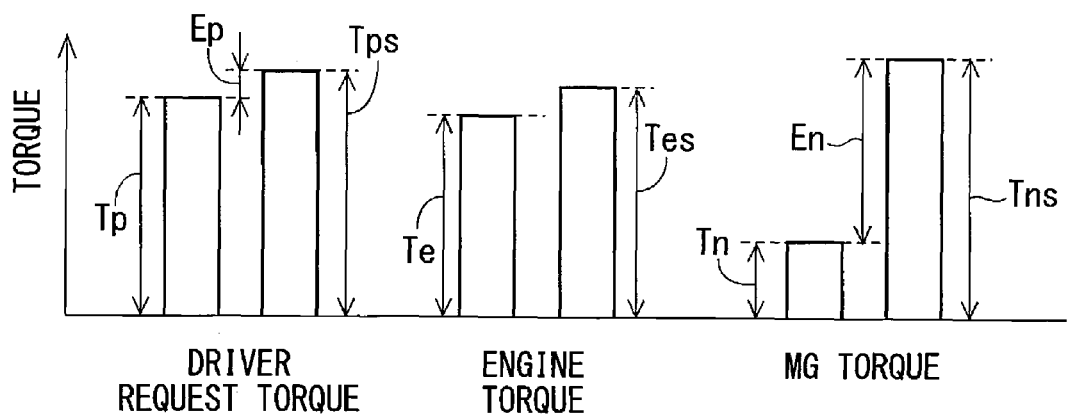
FIGS. 31A and 31B are diagrams for explaining the abnormality determining process according to the eighth embodiment.
Figure 31B:
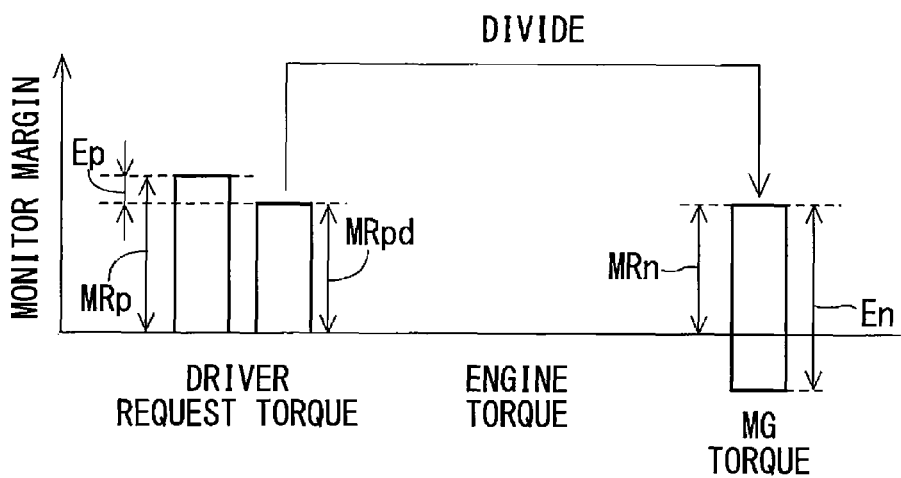

Next, concrete examples of the abnormality determining process are described with reference to FIGS. 30A and 30B and FIGS. 31A and 31B. FIGS. 30A and 31A show a comparison between the command value and the monitor value. FIGS. 30B and 31B show the monitor margin. For the sake of simplicity of explanation, the conversion coefficient Kn is set to one, i.e., Kn=1.

FIGS. 30A and 30B show a normal case where it is determined that the abnormality does not occur. In this example, as shown in FIG. 30A, regarding the driver request torque and the engine torque, the command value is almost equal to the monitor value. Here, it is assumed that the driver request torque excess amount Ep is zero, so that the divisional driver request torque monitor margin MRpd is equal to the driver request torque monitor margin MRp. Regarding the MG torque, the MG torque monitor value Tns is greater than the MG torque command value Tn by the MG torque excess amount En.

As shown in FIG. 30B, the divisional driver request torque monitor margin MRpd is divided to the MG torque monitor margin MRn. In this case, since a value calculated by subtracting the MG torque excess amount En from the MG torque monitor margin MRn is not smaller than zero (corresponding to NO at S628 in FIG. 29), it is determined at S629 in FIG. 29 that the abnormality does not occur, and the fail-safe procedure is not performed.

FIGS. 31A and 31B show an abnormal case where it is determined that the abnormality occurs. In this example, the driver request torque excess amount Ep and the MG torque excess amount En are those shown in FIG. 31A. It is noted that the engine torque excess amount Ee is not calculated.

As shown in FIG. 31B, the divisional driver request torque monitor margin MRpd is divided to the MG torque monitor margin MRn. In this case, since a value calculated by subtracting the MG torque excess amount En from the MG torque monitor margin MRn is smaller than zero (corresponding to YES at S628 in FIG. 29), it is determined at S630 in FIG. 29 that the abnormality occurs, and the fail-safe procedure is performed at S117 in FIG. 9.

As described above, according to the eighth embodiment, like in the fourth embodiment, the monitoring of the engine torque command value Te is omitted in order not to calculate the engine torque monitor margin MRe and the engine torque excess amount Ee.

Accordingly, the monitor margin, which is divided to the engine torque in the sixth embodiment, is divided to the MG torque monitor margin MRn. In other words, according to the eighth embodiment, the entire driver request torque monitor margin MRp is divided to the MG torque monitor margin MRn.

In such an approach, the function of the driver request torque monitor margin MRp can be maximized within the driver request torque monitor margin MRp. Thus, it is possible to prevent the fail-safe procedure from being performed unnecessarily.

By the way, in a system where an abnormality in the engine 10 can be determined separately, the engine 10 may be disconnected from the drive shaft 92 by hydraulic force upon determination that the abnormality occurs in the engine 10. When the engine 10 is disconnected from the drive shaft 92 by hydraulic force upon determination that the abnormality occurs in the engine 10, the drive shaft 92 and the drive wheel 93 are driven by torque of the rotating electrical machine 25.

In this case, since the entire driver request torque monitor margin MRp is divided to the MG torque monitor margin MRn, the function of the driver request torque monitor margin MRp can be used adequately.

In addition, the same advantages as the preceding embodiments can be obtained.

Correspondence between terms used in the eighth embodiment and claims is as follows.

Figure 29:
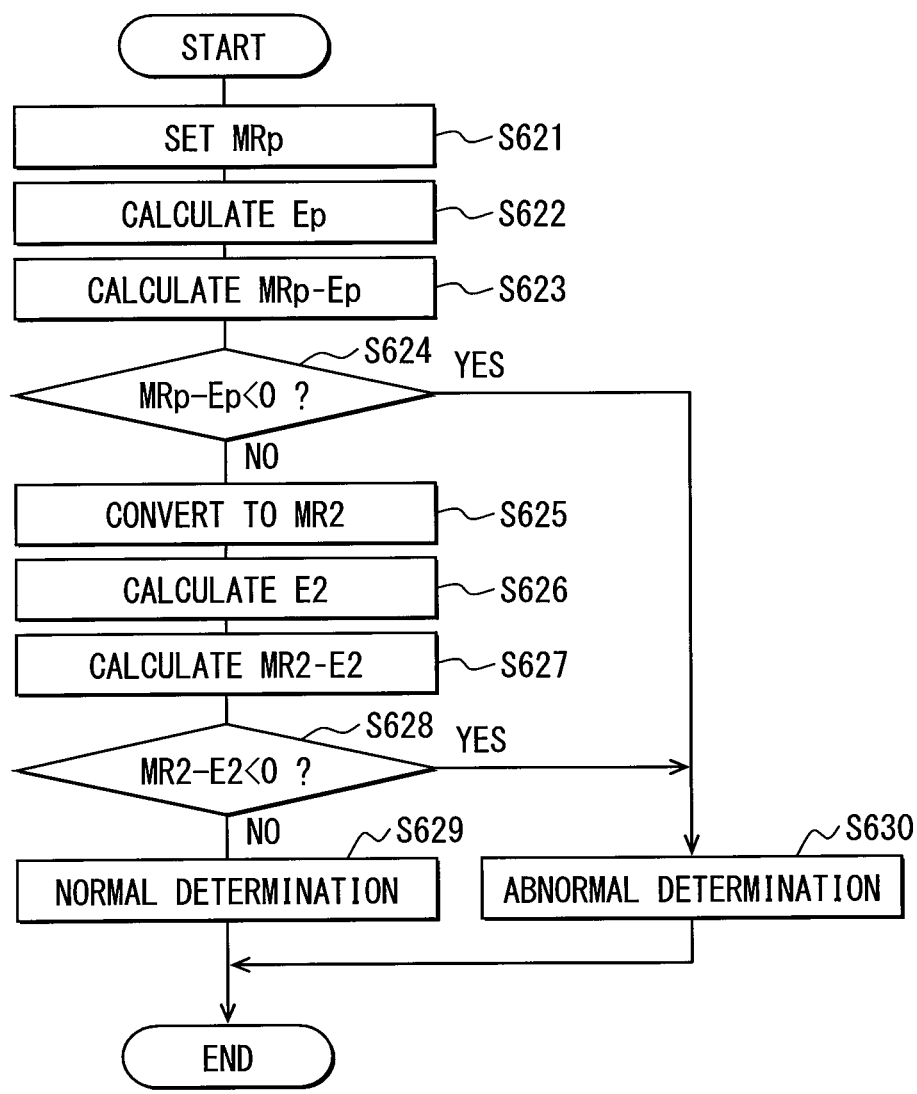
FIG. 29 is a flowchart for explaining an abnormality determining process according to an eighth embodiment of the present disclosure.

S621 in FIG. 29 corresponds to a function of the driver request torque monitor margin setting device. S625 in FIG. 29 correspond to a function of the driving-source monitor margin calculating device.

Ninth Embodiment

A ninth embodiment of the present disclosure is described below with reference to FIG. 32. The ninth embodiment is similar in configuration to the first embodiment, but different in the method of calculating the monitor margin.

Figure 32:
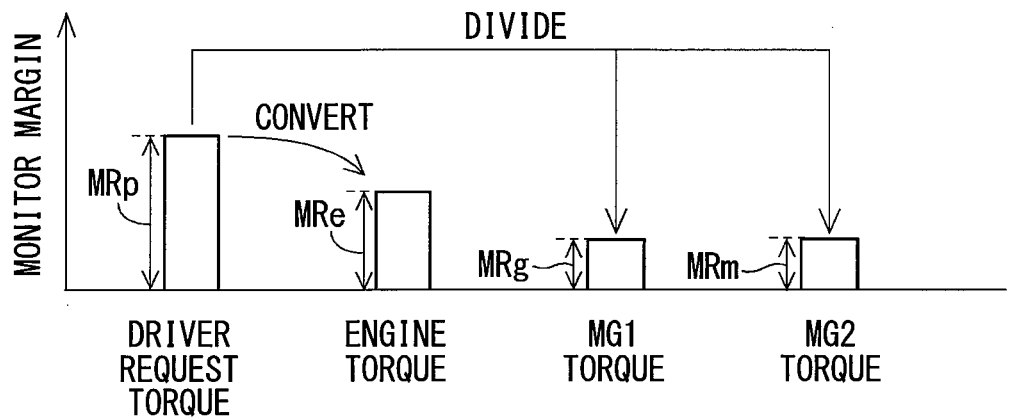
FIG. 32 is a diagram for explaining a method of calculating a monitor margin according to a ninth embodiment of the present disclosure.

FIG. 32 shows a method of calculating the monitor margin according to the ninth embodiment. FIG. 32 is based on the assumption that the driver request torque excess amount Ep is zero.

As shown in FIG. 32, according to the ninth embodiment, the engine torque monitor margin MRe is calculated by referring to a prestored map based on a value which is calculated by subtracting the driver request torque excess amount Ep from the driver request torque monitor margin MRp.

In contrast, the MG1 torque monitor margin MRg and the MG2 torque monitor margin MRm are calculated by multiplying the value, which is calculated by subtracting the driver request torque excess amount Ep from the driver request torque monitor margin MRp, by the respective divisional coefficients (refer to the formulas (11) and (12)).

That is, according to the ninth embodiment, while the engine torque monitor margin MRe is converted based on the driver request torque monitor margin MRp, the MG1 torque monitor margin MRg and the MG2 torque monitor margin MRm are divided based on the driver request torque monitor margin MRp.

The abnormality determining processes described in the preceding embodiments can be employed in the ninth embodiment.

As described above, according to the ninth embodiment, the ECU 50 calculates the engine torque monitor margin MRe based on the value, which is calculated by subtracting the driver request torque excess amount Ep from the driver request torque monitor margin MRp, by using the conversion formula. Further, the ECU 50 calculates the MG1 torque monitor margin MRg and the MG2 torque monitor margin MRm by dividing the value, which is calculated by subtracting the driver request torque excess amount Ep from the driver request torque monitor margin MRp, at the predetermined divisional ratio.

Even in such an approach, the same advantages as the preceding embodiments can be obtained.

Tenth Embodiment

A tenth embodiment of the present disclosure is described below with reference to FIG. 33. The tenth embodiment is similar in configuration to the first embodiment, but different in the method of calculating the monitor margin.

Figure 33:
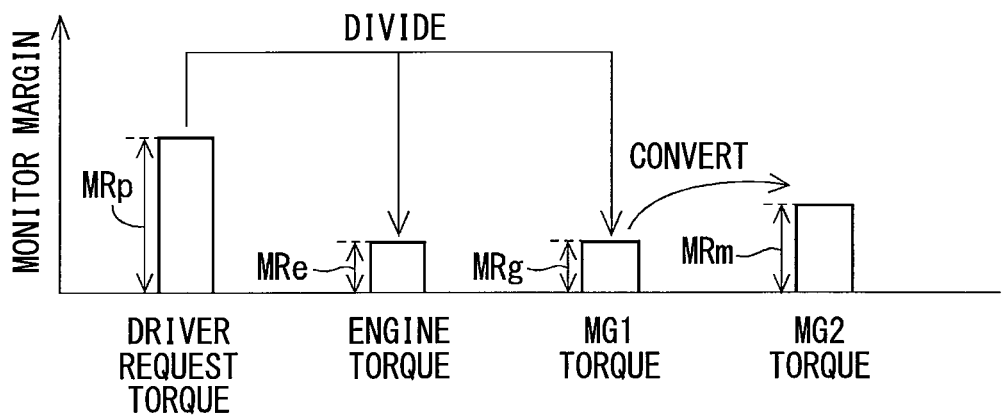
FIG. 33 is a diagram for explaining a method of calculating a monitor margin according to a tenth embodiment of the present disclosure.

FIG. 33 shows a method of calculating the monitor margin according to the tenth embodiment. FIG. 33 is based on the assumption that both the driver request torque excess amount Ep and the MG1 torque excess amount Eg are zero.

As shown in FIG. 33, according to the tenth embodiment, the engine torque monitor margin MRe and the MG1 torque monitor margin MRg are calculated by multiplying the value, which is calculated by subtracting the driver request torque excess amount Ep from the driver request torque monitor margin MRp, by the respective divisional coefficients (refer to the formulas (10) and (11)).

In contrast, the MG2 torque monitor margin MRm is converted based on the MG1 torque monitor margin MRg.

That is, according to the tenth embodiment, while the engine torque monitor margin MRe and the MG1 torque monitor margin MRg are divided based on the driver request torque monitor margin MRp, the MG2 torque monitor margin MRm is converted based on the MG1 torque monitor margin MRg.

The abnormality determining processes described in the preceding embodiments can be employed in the ninth embodiment.

As described above, according to the tenth embodiment, the ECU 50 calculates the engine torque monitor margin MRe and the MG1 torque monitor margin MRg by dividing the value, which is calculated by subtracting the driver request torque excess amount Ep from the driver request torque monitor margin MRp, at the predetermined divisional ratio. Further, the ECU 50 calculates the MG2 torque monitor margin MRm based on the value which is calculated by subtracting the MG1 torque excess amount Eg from the MG1 torque monitor margin MRg.

For example, when the ECU 50 includes an engine ECU for controlling the engine 10 and a MG-ECU for controlling the first rotating electrical machine 21 and the second rotating electrical machine 22, firstly, the engine torque monitor margin MRe used in the engine ECU and the MG1 torque monitor margin MRg used in the MG-ECU can be calculated by dividing the driver request torque monitor margin MRp, and then the MG2 torque monitor margin MRm can be calculated by converting the MG1 torque monitor margin MRg inside the MG-ECU. In such an approach, the monitor margin is converted in each process to calculate the MG2 torque command value Tm from the MG1 torque command value Tg so that the monitoring can be performed in detail.

Further, according to the tenth embodiment, the same advantages as the preceding embodiments can be obtained.

Modifications

While the present disclosure has been described with reference to the embodiment, it is to be understood that the disclosure is not limited to the embodiment. The present disclosure is intended to cover various modifications and equivalent arrangements within the spirit and scope of the present disclosure.

In the embodiments, a candidate having the minimum absolute value among prestored candidates is set as the driver request torque monitor margin MRp. Alternatively, when the candidates are stored according to vehicle driving conditions including a sudden acceleration, a sudden deceleration, and a reverse movement, the candidate for the driver request torque monitor margin MRp can be selected based on driver operation information including the accelerator opening degree information, the brake information, and the shift information. That is, a driver request torque monitor margin setting device can set a driver request torque monitor margin based on driver operation information.

In the embodiments, when two rotating electrical machines are included in the driving sources in addition to the engine, the engine is defined as the first driving source, the first rotating electrical machine is defined as the second driving source, and the second rotating electrical machine is defined as the third driving source. Alternatively, any one of the engine and the two rotating electrical machines can be defined as the first driving source, any one of the remaining two driving sources can be defined as the second driving source, and the other can be defined as the third driving source.

In the embodiments, when one rotating electrical machine is included in the driving sources in addition to the engine, the engine is defined as the first driving source, and the rotating electrical machine is defined as the second driving source. Alternatively, the rotating electrical machine can be defined as the first driving source, and the engine can be defined as the second driving source.

In the third and seventh embodiments, the monitoring of the engine torque command value is omitted. Alternatively, the monitoring of the MG1 torque command value or the MG2 torque command value can be omitted.

In the fourth and eighth embodiments, the monitoring of the engine torque command value is omitted. Alternatively, the monitoring of the MG torque command value can be omitted.

In the embodiments, the engine torque command value Te corresponds to torque which is used to drive the drive shaft and the drive wheel and not used to charge the battery. Alternatively, the engine torque command value Te can be determined in consideration of a charging request of the battery based on the state of charge (SOC), the minimum temperature of cells of the battery. In this case, for example, in the first embodiment, a command value for direct torque transmitted to the drive shaft side can be calculated based on the engine torque command value and the MG1 torque command value, and an abnormality in the direct torque command value can be determined by calculating a direct torque monitor value used to monitor the direct torque command value and by setting a direct torque monitor margin based on the driver request torque monitor margin MRp.

In the embodiments, the abnormality monitoring is performed by using the engine torque. Alternatively, when power of the engine is controlled, the abnormality monitoring can be performed by using the engine power instead of the engine torque. That is, the engine torque command value, the engine torque monitor value, the engine torque monitor margin, and the engine torque excess amount can be replaced with an engine power command value, an engine power monitor value, an engine power monitor margin, and an engine power excess amount.

Likewise, power can be used instead of torque for the driver request torque monitor margin, the MG1 torque monitor margin, the MG2 torque monitor margin, and the MG torque monitor margin. Further, power can be used instead of torque for the driver request torque excess amount, the MG1 torque excess amount, the MG2 torque excess amount, and the MG torque excess amount.

That is, the driver request torque monitor margin and the driving-source monitor margin are not limited to torque and can be a value in any units such as power, and also conversion can be performed as needed. Further, the driver request torque excess amount and the driving-source excess amount are not limited to torque and can be a value in any units such as power, and also conversion can be performed as needed.

When the monitor margin and the corresponding excess amount have the same unit, a comparison between them can be easily made. Therefore, if the monitor margin and the excess amount have different units, it is preferable that a unit conversion be made so that the monitor margin and the excess amount can have the same unit.

In examples described below, the engine is power-controlled, the first and second rotating electrical machines are torque-controlled, and a unit of the driver request torque monitor margin is torque.

For example, like in the first embodiment, when the driver request torque monitor margin is converted to each driving-source margin, it is preferable that a conversion be made so that the driver request torque excess amount and the driving-source excess amount can have the same unit as the driver request torque monitor margin (e.g., Nm as a unit of torque). Therefore, the engine power excess amount is converted to a unit of torque and compared with an engine torque monitor margin to which the driver request torque monitor margin is converted. If a unit of the driver request torque monitor margin is torque, there is no need to perform a unit conversion of the driver request torque excess amount, the MG1 torque excess amount, and the MG2 torque excess amount.

That is, a unit conversion is made so that the driver request torque excess amount and the driving-source excess amount can have the same unit as the driver request torque monitor margin and the driving-source monitor margin. In such an approach, a comparison between the excess amount and the margin can be made easily.

Furthermore, like in the fifth embodiment, when the driver request torque monitor margin is divided to each driving-source margin, it is preferable that the driving-source monitor margin be converted to a unit related to controlling of the driving source. Therefore, when the engine is power-controlled, a monitor margin related to monitoring of the engine power command value is converted to a unit of power and compared with the engine power excess amount. If a unit of the driver request torque monitor margin is torque, there is no need to perform a unit conversion of the driver request torque excess amount, the MG1 torque excess amount, and the MG2 torque excess amount.

That is, a unit conversion is made so that the driver request torque monitor margin can have the same unit as the driver request torque excess amount and the driving-source monitor margin can have the same unit as the corresponding driving-source excess amount. In such an approach, a comparison between the excess amount and the margin can be made easily.

Of course, when the driver request torque monitor margin is converted to each driving-source margin, a unit conversion can be made so that the monitor margin can have the same unit as the excess amount, and when the driver request torque monitor margin is divided to each driving-source margin, a unit conversion can be made so that the excess amount can have the same unit as the monitor margin. The concept that a unit conversion is made so that the monitor margin and the excess amount can have the same unit can include a case where the monitor margin and the excess amount originally have the same unit. The same is true for when the number of the rotating electrical machines included in the driving sources is one.

In the first to fourth embodiments, if the value calculated by subtracting the excess amount from the monitor margin is smaller than zero, it is determined that the abnormality occur. Alternatively, the excess amount of each driving source can be accumulated, and if the accumulated value exceeds the monitor margin, it can be determined that the abnormality occurs. Even in the case of dividing the monitor margin, when the excess amount exceeds the monitor margin, it can be determined that the abnormality occurs.

In the embodiments, the vehicle control apparatus includes one ECU. Alternatively, the vehicle control apparatus can include multiple ECUs. For example, the vehicle control apparatus can include an engine ECU for controlling the engine and a MG-ECU for controlling the rotating electrical machine. In this case, it is not preferable that the abnormality monitoring for the engine torque command value outputted from the engine ECU to the MG-ECU be omitted.

In the embodiments, the rotating electrical machines are permanent magnet three-phase synchronous rotating electrical machines. Alternatively, the rotating electrical machines can be induction rotating electrical machines or other types of synchronous rotating electrical machines.

In the embodiments, the vehicle control apparatus is applied to so-called "series-parallel hybrid vehicles" and "parallel hybrid vehicles". Alternatively, the vehicle control apparatus can be applied to other types of vehicles which have multiple driving sources including both an engine and a rotating electrical machine.

In the embodiments, the dividing mechanism 40 is configured as a planetary gear train. Alternatively, the dividing mechanism 40 can be configured as an electromagnetic clutch, a fluid clutch (coupling), etc.

Such changes and modifications are to be understood as being within the scope of the present invention as defined by the appended claims.

What is claimed is:

1. A vehicle control apparatus for controlling a vehicle equipped with a plurality of driving sources including an engine and a rotating electrical machine, the vehicle control apparatus comprising:
a driver request torque command value calculating device that calculates a driver request torque command value based on driver operation information;
a driving-source command value calculating device that calculates a plurality of driving-source command values used to separately control the plurality of driving sources by dividing the driver request torque command value among the plurality of driving sources;
a monitor value calculating device that calculates a driver request torque monitor value and a plurality of driving-source monitor values, the driver request torque monitor value being used to monitor an abnormality in the driver request torque command value, the plurality of driving-source monitor values being used to monitor an abnormality in the plurality of driving-source command values;
a driver request torque monitor margin setting device that sets a driver request torque monitor margin, the driver request torque monitor margin being used to determine the abnormality in the driver request torque command value based a driver request torque excess amount which is a difference between the driver request torque command value and the driver request torque monitor value;
a driving-source monitor margin calculating device that calculates a plurality of driving-source monitor margins based on the driver request torque monitor margin, the plurality of driving-source monitor margins being used to determine the abnormality in the plurality of driving-source command values based on a plurality of driving-source excess amounts which is a difference between the plurality of driving-source command values and the plurality of driving-source monitor values; and
an abnormality determining device that determines the abnormality in the plurality of driving-source command values based on the plurality of driving-source monitor margins before the driving-source command values are outputted to the driving sources without using control results obtained by actually controlling the driving sources with the driving-source command values.

2. The vehicle control apparatus according to claim 1, wherein
the driving-source monitor margin calculating device calculates the plurality of driving-source monitor margins based on a value, which is calculated by subtracting the driver command torque excess amount from the driver command torque monitor margin, by using a predetermined conversion formula.

3. The vehicle control apparatus according to claim 1, wherein
the driving-source monitor margin calculating device calculates the plurality of driving-source monitor margins by dividing a value, which is calculated by subtracting the driver command torque excess amount from the driver command torque monitor margin, at a predetermined divisional ratio.

4. The vehicle control apparatus according to claim 1, wherein
the rotating electrical machine includes a first rotating electrical machine and a second rotating electrical machine,
one of the engine, the first rotating electrical machine, and the second rotating electrical machine is defined as a first driving source, another is defined as a second driving source, and the other is defined as a third driving source,
the driving-source command value calculating device calculates a first command value used to control the first driving source, a second command value used to control the second driving source, and a third command value used to control the third driving source,
the monitor value calculating device calculates a first monitor value used to monitor the abnormality in the first command value, a second monitor value used to monitor the abnormality in the second command value, and a third monitor value used to monitor the abnormality in the third command value, the driving-source monitor margin calculating device calculates at least wo of a first monitor margin, a second monitor margin, and a third monitor margin, the first monitor margin is used to determine the abnormality in the first command value based on a first excess amount which is a difference between the first command value and the first monitor value, the second monitor margin is used to determine the abnormality in the second command value based on a second excess amount which is a difference between the second command value and the second monitor value, and the third monitor margin is used to determine the abnormality in the third command value based on a third excess amount which is a difference between the third command value and the third monitor value.

5. The vehicle control apparatus according to claim 4, wherein the driving-source monitor margin calculating device sequentially calculates the at least two of the first monitor margin, the second monitor margin, and the third monitor margin based on a value, which is calculated by subtracting the driver request torque excess amount from the driver request torque monitor margin, by using a predetermined conversion formula.

6. The vehicle control apparatus according to claim 4, wherein the driving-source monitor margin calculating device calculates the at least two of the first monitor margin, the second monitor margin, and the third monitor margin by dividing a value, which is calculated by subtracting the driver request torque excess amount from the driver request torque monitor margin, at a predetermined divisional ratio.

7. The vehicle control apparatus according to claim 4, wherein the driving-source monitor margin calculating device calculates the first monitor margin based on a value, which is calculated by subtracting the driver request torque excess amount from the driver request torque monitor margin, by using a predetermined conversion formula, and the driving-source monitor margin calculating device calculates the second monitor margin and the third monitor margin by dividing the value, which is calculated by subtracting the driver request torque excess amount from the driver request torque monitor margin, at a predetermined divisional ratio.

8. The vehicle control apparatus according to claim 4, wherein the driving-source monitor margin calculating device calculates the first monitor margin and the second monitor margin by dividing a value, which is calculated by subtracting the driver request torque excess amount from the driver request torque monitor margin, at a predetermined divisional ratio, and the driving-source monitor margin calculating device calculates the third monitor margin based on a value, which is calculated by subtracting the second excess amount from the second monitor margin.

9. The vehicle control apparatus according to claim 1, wherein when any one of the plurality of driving-source excess amounts exceeds a corresponding driving-source monitor margin, the abnormality determining device determines that the abnormality occurs in a corresponding driving-source command value.

10. The vehicle control apparatus according to claim 1, wherein the driver request torque monitor margin setting device sets one of a plurality of prestored candidates as the driver request torque monitor margin, and the one of the plurality of prestored candidates has the minimum value among the plurality of prestored candidate.

11. The vehicle control apparatus according to claim 1, wherein the driver request torque monitor margin setting device sets the driver request torque monitor margin based on the driver operation information.

12. The vehicle control apparatus according to claim 1, wherein the driver request torque excess amount and the plurality of driving-source excess amounts are converted to the same unit as the driver request torque monitor margin and the plurality of driving-source monitor margins.

13. The vehicle control apparatus according to claim 1, wherein the driver request torque monitor margin is converted to the same unit as the driver request torque excess amount, and each of the plurality of driving-source monitor margins is converted to the same unit as a corresponding one of the plurality of driving-source excess amounts.

14. The vehicle control apparatus according to claim 1, wherein the control results include an actual torque obtained by actually controlling one of the driving sources so that the abnormality determining device determines the abnormality before the driving-source command values are outputted to the driving sources without using the actual torque obtained by actually controlling one of the driving sources with the torque command value.

15. The vehicle control apparatus according to claim 1, wherein the driver request torque command value calculating device calculates the driver request torque command value and the monitor value calculating device calculates the driver request torque monitor value independently from each other and using different formulas or parameters.

16. The vehicle control apparatus according to claim 1, wherein the driving-source command value calculating device calculates the plurality of driving-source command values and the monitor value calculating device calculates the plurality of driving-source monitor values independently from each other and using different formulas or parameters.

17. The vehicle control apparatus according to claim 1, wherein the driving-source command value calculating device calculates the plurality of driving-source command values and the monitor value calculating device calculates the plurality of driving-source monitor values such that the monitor values are opposite to signs of the command values.

* * * * *